(12) United States Patent
Ogata

(10) Patent No.: US 6,332,043 B1
(45) Date of Patent: Dec. 18, 2001

(54) DATA ENCODING METHOD AND APPARATUS, DATA DECODING METHOD AND APPARATUS AND RECORDING MEDIUM

(75) Inventor: Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/200,416

(22) Filed: Nov. 27, 1998

Related U.S. Application Data

(63) Continuation of application No. PCT/JP98/01410, filed on Mar. 27, 1998.

(30) Foreign Application Priority Data

Mar. 28, 1997 (JP) .................................................. 9-078618

(51) Int. Cl.[7] .............................. G06K 9/36; G06K 9/46
(52) U.S. Cl. ..................... 382/240; 375/240.19; 382/261
(58) Field of Search .................................. 382/232, 233, 382/239, 240, 248, 261; 375/240.02, 240.11, 240.18, 240.19; 348/397.1, 398.1, 404.1, 408.1, 437.1, 438.1; 341/79; 358/430; 708/322; 704/500, 503

(56) References Cited

U.S. PATENT DOCUMENTS

| | | | |
|---|---|---|---|
| 5,867,602 | * | 2/1999 | Zandi et al. ........................ 382/240 |
| 5,909,518 | * | 6/1999 | Chui .................................... 382/233 |
| 5,943,367 | * | 8/1999 | Theunis ............................... 708/322 |
| 5,978,762 | * | 11/1999 | Smyth et al. ....................... 704/500 |

FOREIGN PATENT DOCUMENTS

| | | | |
|---|---|---|---|
| 4-323962 | 11/1992 | (JP) | ............................... H04N/1/41 |
| 5-273243 | 10/1993 | (JP) | ............................... G01R/13/20 |
| 6-178282 | 6/1994 | (JP) | ............................... H04N/7/133 |
| 7-203441 | 8/1995 | (JP) | ............................... H04N/7/30 |
| 8-167853 | 6/1996 | (JP) | ............................... H03M/7/40 |
| 9-27912 | 1/1997 | (JP) | ............................... H04N/1/41 |
| 9-130801 | 5/1997 | (JP) | ............................... H04N/7/30 |
| 9-182071 | 7/1997 | (JP) | ............................... H04N/7/30 |

\* cited by examiner

Primary Examiner—Timothy M. Johnson
(74) Attorney, Agent, or Firm—Frommer Lawrence & Haug LLP.; William S. Frommer; Dexter T. Chang

(57) ABSTRACT

A data encoding method including an encoding step of encoding data using wavelet transform and a multiplexing/transmitting step of appending the information on encoding used for decoding on the decoder side to a bitstream of data encoded using the wavelet transform for transmitting the resulting information. This enables switching of filters depending on the picture or the computational capability that can be furnished by an apparatus and desirable initial setting depending on the input picture or bitrate to realize good picture quality.

8 Claims, 27 Drawing Sheets

| default/download | NL | DL | Lcoef0 | Lcoef1 | ... | NH | DH | Hcoef0 | Hcoef1 | ... |

FIG.3

|  | NL/NH | DL/DH | COEFFICIENTS | TOTAL NUMBER OF BITS |
|---|---|---|---|---|
| LPF | 3 | 1 | 2*(5 + 25) | |
| HPF | 3 | 1 | 5*(5 + 25) | 219 |
| default/download | | 1 | | |

FIG.5

| NUMBER OF TAPS OF ANALYSIS/SYNTHESIS FILTER | FORWARD POSITION | TERMINAL POSITION |
|---|---|---|
| ODD | 0 | 0 |
| EVEN | - 0.5 | + 0.5 |

(UNIT: SAMPLE)

FIG.7

| default/download | NL | DL | eBL | eEL | Lcoef0 | Lcoef1 | ... | NH | DH | eBH | eEH | Hcoef0 | Hcoef1 | ... |

FIG.9

| default/download | NL | DL | eBL | eEL | Lcoef0 | Lcoef1 | ... | NH | DH | sym | eBH | eEH | Hcoef0 | Hcoef1 | ... |

FIG.10

| default/download | c_type | NL | DL | eBL | eEL | Lcoef0 | Lcoef1 | ... | NH | DH | sym | eBH | eEH | Hcoef0 | Hcoef1 | ... |
|---|---|---|---|---|---|---|---|---|---|---|---|---|---|---|---|---|

FIG.11

LPF
[0] 3/64
[1] -3/32
[2] -1/4
[3] 19/32
[4] 45/32
[5] 19/32
[6] -1/4
[7] -3/32
[8] 3/64

HPF
[0] 1/2
[1] -1
[2] 1/2

FILTER FOR ANALYSIS

LPF
[0] 1/4
[1] 1/2
[2] 1/4

HPF
[0] -3/128
[1] -3/64
[2] 1/8
[3] 19/64
[4] -45/64
[5] 19/64
[6] 1/8
[7] -3/64
[8] -3/128

FILTER FOR ANALYSIS

FIG.12

| alp_size_download | alp_size_0 | alp_size_1 | ... | alp_size_(K-1) |

FIG.13

| model_num | alp_size_0 | alp_size_1 | ... | alp_size_(model_num-1) |
|---|---|---|---|---|

FIG.15

| hist_init_type | model_num | alp_size_0 | alp_size_1 | ... | alp_size_(model_num-1) |

FIG.17

| hist_init_type | hist_download | hist_num | hist_idx_0 | etry_num_0 | v0 | v1 | ... | v(etry_num_0) |
|---|---|---|---|---|---|---|---|---|

| hist_idx_1 | etry_num_1 | v0 | v1 | ... | v(etry_num_1) |
|---|---|---|---|---|---|

FILTER FOR ANALYSIS

LPF
[0] 0.046875
[1] -0.093750
[2] -0.250000
[3] 0.593750
[4] 1.406250
[5] 0.593750
[6] -0.250000
[7] -0.093750
[8] 0.046875

HPF
[0] 0.500000
[1] -1.000000
[2] 0.500000

COEFFICIENTS OF SYNTHESIS FILTER

LPF
[0] 0.250000
[1] 0.500000
[2] 0.250000

HPF
[0] -0.023438
[1] -0.046875
[2] 0.125000
[3] 0.296875
[4] -0.703125
[5] 0.296875
[6] 0.125000
[7] -0.046875
[8] -0.023438

FIG.22

DATA ENCODING METHOD AND APPARATUS, DATA DECODING METHOD AND APPARATUS AND RECORDING MEDIUM

This is a continuation of copending International Application PCT/JP98/01410 having an international filing date of Mar. 27, 1998.

TECHNICAL FIELD

This invention relates to a data processing apparatus for processing digital data using wavelet transform/inverse wavelet transform. More particularly, it relates to a data encoding method and apparatus, a data decoding method and apparatus and a recording medium which may be applied to an acoustic video equipment, communication equipment or a database apparatus for encoding aimed at data compression of speech or pictures or decoding the wavelet encoding.

BACKGROUND ART

FIG. 21 shows a basic structure for band splitting by wavelet transform and synthesis by inverse wavelet transform. An input here is a one-dimensional signal x[i].

Referring to FIG. 21, a wavelet transform unit 2 splits the one-dimensional signal x[i] entering an input terminal 1 into signals of plural frequency bands (sub-band signals). An inverse wavelet transform unit 4 synthesizes the signals xa'[j], xb'[j], xc'[j], . . . , split into sub-bands, in order to restore the input signal x[j]. A signal processor 3 processes data split into plural frequency bands in a pre-set manner. For example, if the signal processor 3 executes the encoding, it executes quantization, variable length encoding, transmission, variable length decoding and dequantization.

That is, in the wavelet transform unit 2, each of analysis filters 11, 12, 13, . . . fed with the one-dimensional signal x[i] splits the one-dimensional signal x[i] entering the input terminal 1 into plural frequency bands. The analysis by these analysis filters 11, 12, 13, . . . gives data strings of respective frequency bands xa[i], xb[i], xc[i], . . . , which are sent to respective downsampling units 21, 22, 23, . . . . These downsampling units 21, 22, 23 execute downsampling of saving data of the data strings of respective frequency bands xa[i], xb[i], xc[i], . . . associated with the sampling intervals Dt (t=1, 2, 3, . . . ) while thinning out the remaining data. The data xa'[i], xb'[i], xc'[i], . . . of the respective frequency bands, obtained on downsampling by the downsampling units 21, 22, 23, . . . are sent to the signal processor 3 for predetermined signal processing.

The data strings of the respective frequency bands, processed in a predetermined manner by the signal processor 3, are sent to the inverse wavelet transform unit 4 which then sends the input data strings of the input respective frequency bands to upsampling units 41, 42, 43, . . . associated with the respective frequency bands. These upsampling units 41, 42, 43, . . . pad the interval between two temporally neighboring data with a suitable number of zeros. The number of inserted zeros is equal to the number of samples (Dt-1) of data thinned out by the downsampling units 21, 22, 23, . . . associated with these upsampling units 41, 42, 43, . . . . This substantially restores the data strings xa[i], xb[i], xc[i], . . . of the respective frequency bands. The data strings xa[i], xb[i], xc[i], . . . of the respective frequency bands, resulting from these upsampling operations, are sent to associated synthesis filters 51, 52, 53, . These synthesis filters 51, 52, 53, . . . perform interpolation processing on the supplied data strings xa[i], xb[i], xc[i], . . . .. Output data of the synthesis filters 51, 52, 53, . . . are sent to an adder 6 which then sums these output data to restore the one-dimensional signal x[i] as a synthesized output signal X"[i] which is outputted at an output terminal 5.

An embodiment for splitting the input one-dimensional signal into two sub-bands is explained specifically. Meanwhile, there are provided two each of the analysis filters and downsampling units of the wavelet transform unit and two each of the upsampling units and synthesis filters of the inverse wavelet transform unit.

In this case, the two analysis filters 11, 12 of the wavelet transform unit are a low-pass filter and a high-pass filter. The two analysis filters, that is the analysis low-pass and high-pass filters 11, 12, band-split the input one-dimensional signal x[i] into a data string XL[i] of the low frequency band and a data string XH[i] of the high frequency band, respectively. Also, the downsampling units 21, 22 decimate the band-split data strings XL[i] and XH[i] every other ample in order to find down-sampled data strings XL[j] and XH[j] of the two frequency bands, as shown by the following equations (1) and (2):

$$XL[j]=XL[i], \text{ where } j=i/2 \ldots \tag{1}$$

$$XH[j]=XH[i], \text{ where } j=i/2 \ldots \tag{2}$$

In the inverse wavelet transform unit, the signal-processed data strings of the two frequency bands have their sample intervals expanded by two by upsampling units 41, 42. In addition, zero-valued samples are inserted at the center positions of the data strings of the two bands. This upsampling operation may be represented by the following equations (3) and (4):

$$XL[i] = \begin{cases} XL[j] & i = 2 \times j \\ 0 & i = 2 \times j + 1 \end{cases} \tag{3}$$

$$XH[i] = \begin{cases} XH[j] & i = 2 \times j \\ 0 & i = 2 \times j + 1 \end{cases} \tag{4}$$

The data strings XL[i], XH[i] of the respective frequency bands, obtained on upsampling by the upsampling units 41, 42, are sent to a low-pass filter for synthesis 51 and a high-pass filter for synthesis 52, associated with the low-pass filter for analysis 11 and the high-pass filter for analysis 12, respectively. The low-pass filter for synthesis 51 and the high-pass filter for synthesis 52 interpolate the output data strings of the upsampling units 41, 42. The data strings XL[i], XH[i] of the respective frequency bands are summed together by an adder 6 (specifically an adder summing two data strings together) in order to restore the input signal x[i] as the synthesis output signal X"[i].

The low-pass filter for analysis 11 and the high-pass filter for analysis 12 on the side of the wavelet transform unit 2 and the low-pass filter for synthesis 51 and the high-pass filter for synthesis 52 on the side of the inverse wavelet transform unit 4 are configured for completely or approximately satisfying the relation of the following equations (5) and (6):

$$H0(-z)F0(z)+H1(-z)F1(z)=0 \tag{5}$$

$$H0(z)F0(z)+H1(z)F1(z)=2z-L \ldots \tag{6}$$

In the above equations (5) and (6), H0(z), H1(z), F0(z) and F1(z) are transfer functions of the low-pass filter for analysis 11, high-pass filter for analysis 12, low-pass filter for synthesis 51 and the high-pass filter for synthesis 52, respectively, L being an optional integer. By these constraint conditions, it can be assured that, if the input data is infinitely long, the output signal X"[i] of the adder 6 in the inverse wavelet transform unit 4 can completely or approximately coincide with the input signal x[i]. FIG. 22 shows an example of filter coefficients of the low-pass filter for analysis 11, high-pass filter for analysis 12, low-pass filter for synthesis 51 and the high-pass filter for synthesis 52, associated with one another.

If the above-mentioned wavelet splitting/synthesis is used for encoding, encoding/decoding is carried out between the downsampling units 21, 22 and the upsampling units 41, 42 of FIG. 21.

FIGS. 23 and 24 show a conventional structure of an encoding device and a decoding device for a one-dimensional data string employing wavelet transform.

In an encoding device 60, shown in FIG. 23, an input signal x[i] at an input terminal 61 is band-split by a low-pass filter for analysis 62 and a high-pass filter for analysis 63 into a data string XL0[i] of the low frequency band and a data string XH0[i] of the high frequency band. The data string XL0[i] of the low frequency band and the data string XH0[i] of the high frequency band are sent to associated downsampling units 64, 65 for sub-sampling as indicated by the equation (1).

The data string XL0[i] of the low frequency band, sub-sampled by the downsampling unit 64, is further band-split by a low-pass filter for analysis 66 and a high-pass filter for analysis 67. The data string, outputted by the low-pass filter for analysis 66, and the data string, outputted by the high-pass filter for analysis 67, are termed a data string XL1[i] of the low frequency band and a data string XH1[i] of the intermediate frequency band, respectively. The data string XL1[i] of the low frequency band and the data string XH1[j] of the intermediate frequency band are down-sampled by associated quantizers 71, 72, respectively.

On the other hand, the data string XH0[i] of the high frequency band, passed through the high-pass filter for synthesis 63, is down-sampled by a downsampling unit 65. The data string XH0[i] of the high frequency band, resulting from downsampling by the downsampling unit 65, is sent to a delay unit 70 for synchronization with the data string XL1[k] of the low frequency band and a data string XH1[k] of the intermediate frequency band.

The data string XH0[j] of the high frequency band, delayed by the delay unit 70 for synchronization, and the data string XL1[k] of the low frequency band and the data string XH1[k] of the intermediate frequency band, down-sampled by second-stage downsampling units 68, 69, respectively, are entered to the associated quantizers 71, 72, 73 so as to be thereby quantized as shown by the equations (7), (8) and (9):

$$XL1'[k]=XL1[k]/QL1 \tag{7}$$

$$XH1'[k]=XH1[k]/QH1 \tag{8}$$

$$XH0'[i]=XH0[j]/QH0 \tag{9}$$

employing associated quantization steps QH0, QH1, QL1, respectively. In these equations, rounding of the subdecimal number is by half-adjustment.

The data strings XL1'[k], XH1'[k] and XH0'[j], quantized by the quantizers 71, 72, 73, are entered to a reversible encoder/multiplexer 74 so as to be thereby compressed in a loss-free manner using adaptive arithmetic encoding. The resulting data strings are further multiplexed and outputted at an output terminal 75. The output signal to which an error correction code is appended is modulated so as to be recorded on a storage medium or transmitted over a transmission channel.

The data strings, subsequently reproduced from the storage medium and transmitted over the transmission channel, are demodulated and corrected for errors so as to be sent to a decoding device 80 shown in FIG. 24.

The arithmetic encoding is explained briefly. In the arithmetic encoding, a domain [0, 1) is split in proportion to the probability of occurrence of each symbol, where "[" means including values on the boundary and ")" means excluding values on the boundary, so that the above band corresponds to a domain of presence of x satisfying $0 \leq x \leq 1$. The operation of associating the symbols being encoded to this partial domain is repeated recursively for a series of symbols. The decimal portion of a coordinate of a point comprised in the resulting domain, represented by binary sub-zero portion that can at least be demarcated from other domains, is used as a code. In the adaptive arithmetic encoding for input data, the probability of occurrence of each symbol is corrected each time data is entered. For monitoring the probability of occurrence of each symbol, a histogram representing the frequency of occurrence of each symbol is used. In executing the operation on the histogram, it is necessary to pre-set the maximum size that can be assumed by a symbol (this maximum value is hereinafter referred to as an alphabetical size). For this value, a value common to the encoding device and the decoding device is assumed to be set. Should there occur a symbol larger than the alphabetical size set on the encoding device side, it is replaced by the alphabetical size for encoding.

In a decoding device 80, shown in FIG. 24, signals are sent from a storage medium or over a transmission channel to an input terminal 81 and thence to a demultiplexer/reversible decoder 82. This demultiplexer/reversible decoder 82 performs demultiplexing and decoding, as inverse operations of the multiplexing and reversible encoding by the reversible encoder/multiplexer 74 of an encoding device 60, in order to restore data strings XL1'[k], XH1'[k] and XH0?[j]. These data strings are entered to associated dequantizers 83, 84, 85 where the data strings are dequantized, by way of reverse operations from the quantizers 71 to 73, in accordance with the following equations (10) to (12)

$$XL1''[k]=XL1'[k] \times QL1 \tag{10}$$

$$XH1[k]XH1'[k] \times QH1 \tag{11}$$

$$XH0''[j]=XH0'[j] \times QH0 \tag{12}$$

using respective different quantization steps QH0, QH1, QL1, in order to find data strings XL1"[k], XH1"[k] and XH0"[j].

The data string XL1"[k] of the low frequency band and the data string XH1"[k] of the intermediate band are entered to associated upsampling units 86, 87, respectively. The data string XL1"[j] of the low frequency band and the data string XH1"[j] of the intermediate band, upsampled in a manner as in the equations (3) and (4), are sent to associated synthesis filters, that is a second low-pass filter for analysis 88 and a second high-pass filter for analysis 89. The low-pass filter for synthesis 88 and the second high-pass filter for synthesis 89 are related with the low-pass filter for analysis 66 and the high-pass filter for analysis 67 as shown by the equations (5) and (6). Output data strings of the low-pass filter for synthesis 88 and the second high-pass filter for synthesis 89 are summed in an adder 90 and entered as a data string XL0"[j] to an upsampling unit 92. This data string XL0"[j] is associated with the data string XL0[j] of the low frequency band obtained by first-stage splitting in the encoding device 60.

On the other hand, the data string XH0"[j] of the high frequency band is also entered to the upsampling unit 93. The data string XH0"[j] is entered to a delay unit 91 for synchronization with the data string XH1"[j] of the intermediate frequency band and the data string XL1"[j] of the low frequency band via the low-pass filter for synthesis 88, high-pass filter for synthesis 89 and via the adder 90, that is for providing a delay necessary for re-construction of the output data string XL0"[j] from the adder 90.

The data string XH0"[j] of the high frequency band, delayed by the delay unit 91, and the output data string XL0"[j] from the adder 90, are upsampled by associated upsampling units 92, 93, respectively. The resulting data strings, that is the data string XL0"[i] of the low frequency band and the data string XH0"[i] of the high frequency band are respectively entered to a low-pass filter for synthesis 94 and to a high-pass filter for synthesis 95, associated respectively with the low-pass filter for analysis 66 and the high-pass filter for analysis 67 of the encoding device 60. Output data strings of the low-pass filter for synthesis 94 and the high-pass filter for synthesis 95, are summed together by an adder 96 so as to be outputted at an output terminal 97 as a regenerated signal X"[8 i] associate with the input signal x[i] of the encoding device 60.

Although the same combination of the low-pass filter for analysis, high-pass filter for analysis, low-pass filter for synthesis and the high-pass filter for synthesis is used in the above embodiment for all splitting levels, it is also possible to use different combinations form level to level.

FIGS. 25 and 26 show structures of conventional examples of the two-dimensional picture encoding and decoding devices employing wavelet transform. Specifically, FIG. 25 shows the structure of an encoding device 100 and FIG. 26 shows the structure of a decoding device 150.

The basic structure of the two-dimensional picture encoding device, employing wavelet transform unit, as shown in FIG. 25, is the same as the structure of FIG. 23 described above. However, the input data at this time is a data string obtained on scanning the two-dimensional picture in the sequence shown in FIG. 27. Also, in the present illustrative structure, in order to effect band splitting in both the horizontal and vertical directions on the picture, four filtering operations, namely the low-pass filtering and high-pass filtering in the horizontal direction and those in the vertical direction, are carried out in each stage of splitting in the encoding device 100 of FIG. 25.

Referring first to FIG. 25, the encoding device 100 splits the input signal x[i] entered at an input terminal 101 by a horizontal low-pass filter for analysis 102 and a horizontal high-pass filter for analysis 103, as analysis filters, into a data string in the low frequency band and a data string in the high frequency band in the horizontal direction. In the following description, the output data string from the horizontal low-pass filter for analysis 102 and that from the horizontal high-pass filter for analysis 103 are termed a data string of the first band and a data string of a second band, respectively.

These data strings of the first and second data strings are downsampled by associated downsampling units 104, 105, respectively. These data strings of the first and second data strings, downsampled by associated downsampling units 104, 105, are stored in associated memories 106, 107, respectively.

The data string of the first band, read out from the memory 106, is band-split in the vertical direction by a vertical low-pass filter for analysis 108 and a vertical high-pass filter for analysis 109 in the vertical direction. Similarly, the data string of the second band, read out from the memory 107, is band-split in the vertical direction by a vertical high-pass filter for analysis 108 and a vertical high-pass filter for analysis 111. The memories 106, 107 are line memories for temporarily storing a number of line data required for vertical band splitting by the downstream side vertical low-pass filter for analysis 108, vertical high-pass filter for analysis 109, vertical low-pass filter for analysis 110 and vertical high-pass filter for analysis 111. In the following description, the output data string from the vertical low-pass filter for analysis 108 is termed a data string of the third band, the data string downstream of the vertical high-pass filter for analysis 109 is termed a data string of the fourth band, the data string downstream of the vertical low-pass filter for analysis 110 is termed a data string of the fifth band and the data string downstream of the vertical high-pass filter for analysis 110 is termed a data string of the sixth band.

The data strings of the third to sixth data strings are further down-sampled by the associated downsampling units 112, 113, 114 and 115, respectively.

The data string of the lowest third band, taken out by the vertical low-pass filter for analysis 108 and downsampled by the downsampling unit 112, is further band-split in the horizontal direction by a horizontal low-pass filter for analysis 116 and a horizontal high-pass filter for analysis 117. In the following description, an output data stream from the horizontal low-pass filter for analysis 116 is termed a data string of a seventh band and an output data stream from the horizontal high-pass filter for analysis 117 is termed a data string of an eighth band.

The data strings of the seventh and eighth bands from the horizontal low-pass filter for analysis 116 and the horizontal high-pass filter for analysis 117 are further downsampled by downsampling units 118, 119 so as to be stored in memories 120, 121.

The data string of the seventh band, read out from the memory 120, is further band-split in the vertical direction by a vertical low-pass filter for analysis 122 and a vertical high-pass filter for analysis 123. Similarly, the data string of the eighth band, read out from the memory 121, is further band-split in the vertical direction by a vertical low-pass filter for analysis 124 and a vertical high-pass filter for analysis 125. Thus, the memories 118, 119 are line memories for temporarily storing a number of line data required for vertical band splitting by the downstream side filters 122 to 125. In the following description, the output data string downstream of the vertical low-pass filter for analysis 122 is termed a data string of the ninth band, the data string downstream of the vertical high-pass filter for analysis 123 is termed a data string of the tenth band, the data string downstream of the vertical low-pass filter for analysis 124 is termed a data string of the eleventh band and the data string downstream of the vertical high-pass filter for analysis 125 is termed a data string of the twelfth band.

The data strings of the ninth to twelfth bands are further downsampled by associated downsampling units 126, 127, 128, 129 so as to be sent to associated quantizers 133, 134, 135, 136.

The fourth, fifth and sixth data strings from the downsampling units 113, 114, 115 are entered to delay units 130, 131, 132 for synchronization with the data strings of the ninth to twelfth bands.

The data strings of the fourth to sixth bands, delayed (synchronized) by these delay units 130 to 132, and those of the ninth to twelfth bands from the downsampling units 126 to 129, are sent to associated quantizers 133 to 139, respectively, so as to be quantized by these associated quantizers 133 to 139, using respective different quantization steps.

The respective data strings, quantized by these quantizers 133 to 139, are entered to a reversible encoder/multiplexer 140 so as to be thereby processed with loss-free compression using adaptive arithmetic encoding. The compressed data strings are further multiplexed and outputted at an output terminal 41. To the output signals, error correction codes are further appended, and the resulting signals are modulated for storage on a storage medium or transmission over a transmission channel.

The signals reproduced from the storage medium or transmitted over the transmission channel are demodulated and corrected for errors before being sent to a decoding device 150 shown in FIG. 26.

The signals from the storage medium or over the transmission channel are entered to an input terminal 151 of the decoding device 150 shown in FIG. 26 and thence sent to a demultiplexer/reversible decoder 152. The demultiplexer/reversible decoder 152 performs reverse operations of the multiplexing and reversible encoding applied by the reversible encoder/multiplexer 140 of the encoding device 100 for restoring data strings associated with data strings of the fourth to sixth bands and the ninth to twelfth bands. These data strings are entered to associated dequantizers 153 to 159 so as to be dequantized using respective different quantization steps.

Output data strings of the dequantizers 153 to 159 are sent via associated memories 161 to 164 to upsampling units 165 to 168, respectively, for upsampling. The upsampled data strings are interpolated in the vertical direction by a vertical low-pass filter for synthesis 169, vertical high-pass filter for synthesis 170, a vertical low-pass filter for synthesis 171 and a vertical high-pass filter for synthesis 172, for interpolation in the vertical direction.

Thus, the memories 161 to 164 are line memories for temporarily storing a number of line data required for vertical interpolation by the downstream side synthesis filters 169 to 172.

Output data strings of the vertical low-pass filter for synthesis 169 and the vertical high-pass filter for synthesis 170 are summed together by an adder 173, while output data strings of the vertical low-pass filter for synthesis 171 and the vertical high-pass filter for synthesis 172 are summed together by an adder 174.

Output data strings of the adders 173, 174 are upsampled by associated upsampling units 175, 176 and subsequently interpolated in the horizontal direction by a horizontal low-pass filter for synthesis 177 and a horizontal high-pass filter for synthesis 178, respectively. Output data strings of the horizontal low-pass filter for synthesis 177 and the horizontal high-pass filter for synthesis 178 are summed together by an adder 179 so as to be stored in a memory 183. The data string read out from the memory 183 is upsampled by an upsampling unit 187 and subsequently interpolated in the vertical direction by a vertical low-pass filter for synthesis 191. Thus, the memory 183 is a line memory for temporarily storing a number of line data required for vertical interpolation by the downstream side synthesis filter 191.

On the other hand, output data strings of the dequantizers 157 to 159 are fed via associated memories 184 to 186 and upsampled by upsampling units 188, 189 so as to be interpolated in the vertical direction by a vertical high-pass filter for synthesis 192, a vertical low-pass filter for synthesis 193 and a vertical high-pass filter for synthesis 194. Meanwhile, the data strings sent to the vertical high-pass filter for synthesis 192, vertical low-pass filter for synthesis 193 and to the vertical high-pass filter for synthesis 194, are previously delayed by delaying units 180 to 182 for synchronization between the interpolation by the filters 192 to 194 and the interpolation by the vertical low-pass filter for synthesis 191.

The data string from the vertical low-pass filter for synthesis 191 and the data string from the vertical high-pass filter for synthesis 192 are summed together by an adder 195, while the data string from the vertical low-pass filter for synthesis 193 and the data string from the vertical high-pass filter for synthesis 194 are suited together by an adder 196. These data strings from the adders 195 and 196 are upsampled by associated upsampling units 197, 198 and interpolated in the horizontal direction by a horizontal low-pass filter 199 and a horizontal high-pass filter 200 so as to be then summed together by a adder 201 to regenerate a data string. The regenerated data string is approximately the same data as the input data stream of the encoding device 100 of FIG. 25 and is outputted at an output terminal 202.

In the configuration shown in FIGS. 25 and 26, the downsampling units 112 to 115 and 126 to 129 in the encoding device 100 perform downsampling in the vertical direction, that is line-based decimation, on the picture. Conversely, the upsampling units 165 to 168 and 187 to 190 in the vertical direction in the decoding device 150 perform processing of inserting an all-zero line between input neighboring lines.

Although the same filters are used in the horizontal and vertical directions, it is similarly possible to use different filter sets in the respective directions.

In the conventional encoding or decoding apparatus employing wavelet transform/inverse wavelet transform, as described above, wavelet filters used are previously set, in a majority of cases, such that filters cannot be switched responsive to pictures or to computational ability of the apparatus.

Also, the information as to a proper folding method at the terminal portion of a data string, which differs with different wavelet filters used, cannot be transmitted to the decoding device, or is not used properly on the decoding device, such that correct folding is not achieved to deteriorate the picture quality.

In addition, the optimum initial setting of the histograms, used for monitoring the probability of occurrence of respective symbols required in decoding, such as wavelet coefficients, in adaptive arithmetic encoding, may differ with bitrates or with input pictures, even although the histograms are initially set so as to be equal for all symbols.

Moreover, there is raised a problem that the magnitude of the quantized wavelet coefficients are varied with the quantization steps used, even although the maximum size (alphabetical size) that can be assumed by a symbol is set to a common value for the encoding device and the decoding device and cannot be changed, such that coefficients larger than the pre-set alphabetical size are clipped thus occasionally deteriorating the picture quality.

Furthermore, there is raised a problem that, if the pre-set alphabetical size is larger than the maximum magnitude of the actually occurring symbol, the arithmetic encoding is lowered in compression efficiency.

The present invention has been proposed for overcoming the above-described problem. It is an object of the present invention to provide an encoding method and apparatus, a decoding method and apparatus and a recording medium whereby the filters can be switched depending on the picture or on the possible computational ability of the apparatus and whereby optimum initial setting can be achieved depending on an input picture or bitrate to realize optimum picture quality.

DISCLOSURE OF THE INVENTION

With the encoding method and apparatus according to the present invention, the above problem can be solved by encoding data using wavelet transform, appending the information on encoding used for decoding on the decoder side to a bitstream and transmitting the resulting bitstream to the decoder side.

The information on encoding may be exemplified by a flag indicating which of a filter pre-set on the decoder side or an other optional filter is to be used, and flags indicating the number of taps, amount of phase shift and filter coefficients of filters used on the decoder side, parameters defining the method for extrapolation applied to the terminal portion of the data string and the flag indicating the method of representation of the filter coefficients. The information on encoding may also be the information on arithmetic encoding exemplified by a flag indicating whether or not the possible maximum value of the data for arithmetic encoding is to be used for decoding, the maximum value or the number if the flag indicates using the maximum value, and the information specifying the initializing method.

With the decoding method and apparatus of the present invention, the above problem is solved by decoding the encoded data based on the information on encoding separated from the input bitstream.

The information on encoding may be exemplified by a flag indicating which of a filter pre-set on the decoder side or an other optional filter is to be used, and flags indicating the number of taps, amount of phase shift and filter coefficients of filters used on the decoder side, parameters defining the method for extrapolation applied to the terminal portion of the data string and the flag indicating the method of representation of the filter coefficients. The information on encoding may also be the information on arithmetic encoding exemplified by a flag indicating whether or not the possible maximum value of the data for arithmetic encoding is to be used for decoding, the maximum value or the number if the flag indicates using the maximum value, and the information specifying the initializing method.

That is, according to the present invention, suitable wavelet filters may be used depending on the desired bitrate or the computational capability of the processor. The number of bits for representing the filter coefficients can be set appropriately. Moreover, default filters may be used on addition of a small number of additional bits, while parameters for accurate inverse wavelet transform can be easily obtained using downloaded filters. The decoding side can select appropriate calculating methods for filtering processing depending on the computational capability.

Moreover, with the present invention, the adaptive arithmetic encoding for encoding wavelet coefficients obtained on wavelet transform and other symbols required for decoding in a loss-free manner can be improved in encoding efficiency, and an optimum alphabetical size can be set with a small number of additional bits. Also, data for arithmetic encoding can be classified into plural groups of different statistical properties. If different statistic models are used for respective models, suitable alphabetical size can be set for each model. The histograms for monitoring the occurrence probability of data responsive to the input picture or bitrate can be initialized appropriately.

With the recording medium of the present invention, the above problem can be solved since the bitstream comprised of the encoded data obtained using wavelet transform and the information on the encoding is recorded on the recording medium of the present invention.

BRIEF DESCRIPTION OF THE DRAWINGS

FIG. 3 illustrates a stream of the header information in a first embodiment of the present invention.

FIG. 5 illustrates an example of the number of bits required in downloading a filter.

FIG. 7 illustrates table 1 showing a center position of symmetry by extrapolation.

FIG. 9 illustrates a stream of the header information of a second embodiment of the present invention.

FIG. 10 illustrates a stream of the header information of a third embodiment of the present invention.

FIG. 11 illustrates a stream of the header information of a fourth embodiment of the present invention.

FIG. 12 illustrates wavelet filter coefficients equivalent to FIG. 22.

FIG. 13 illustrates a stream of the header information of a fifth embodiment of the present invention.

FIG. 15 illustrates a stream of the header information of a sixth embodiment of the present invention.

FIG. 17 illustrates a stream of the header information of a seventh embodiment of the present invention.

FIG. 19 illustrates a stream of the header information of an eighth embodiment of the present invention.

FIG. 22 illustrates wavelet filter coefficients.

BEST MODE FOR CARRYING OUT THE INVENTION

Figure 1:
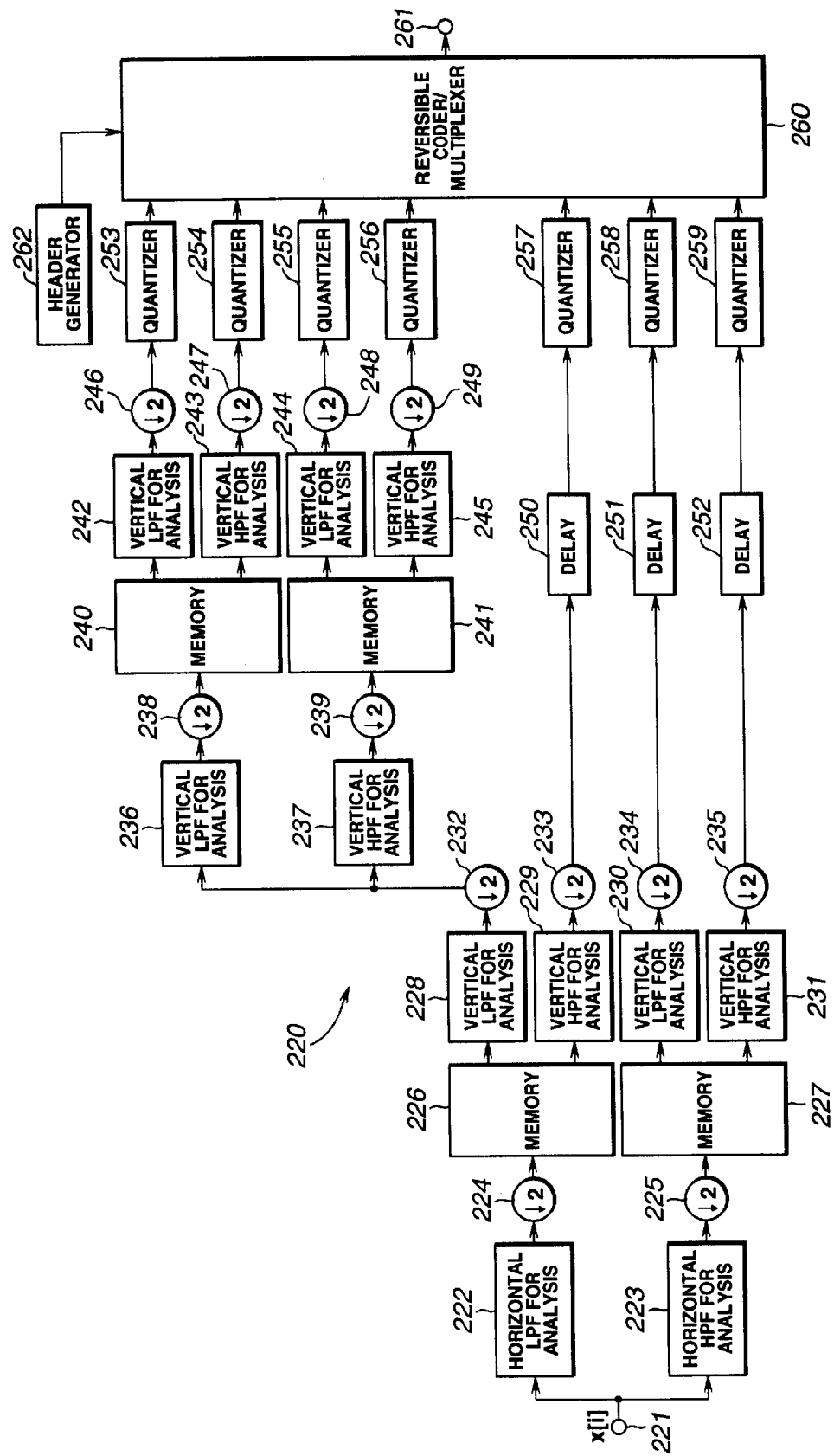
FIG. 1 is a block circuit diagram showing the overall structure of an encoding apparatus embodying the present invention.

Referring to the drawings, preferred embodiments of the present invention will be explained in detail.

Figure 2:
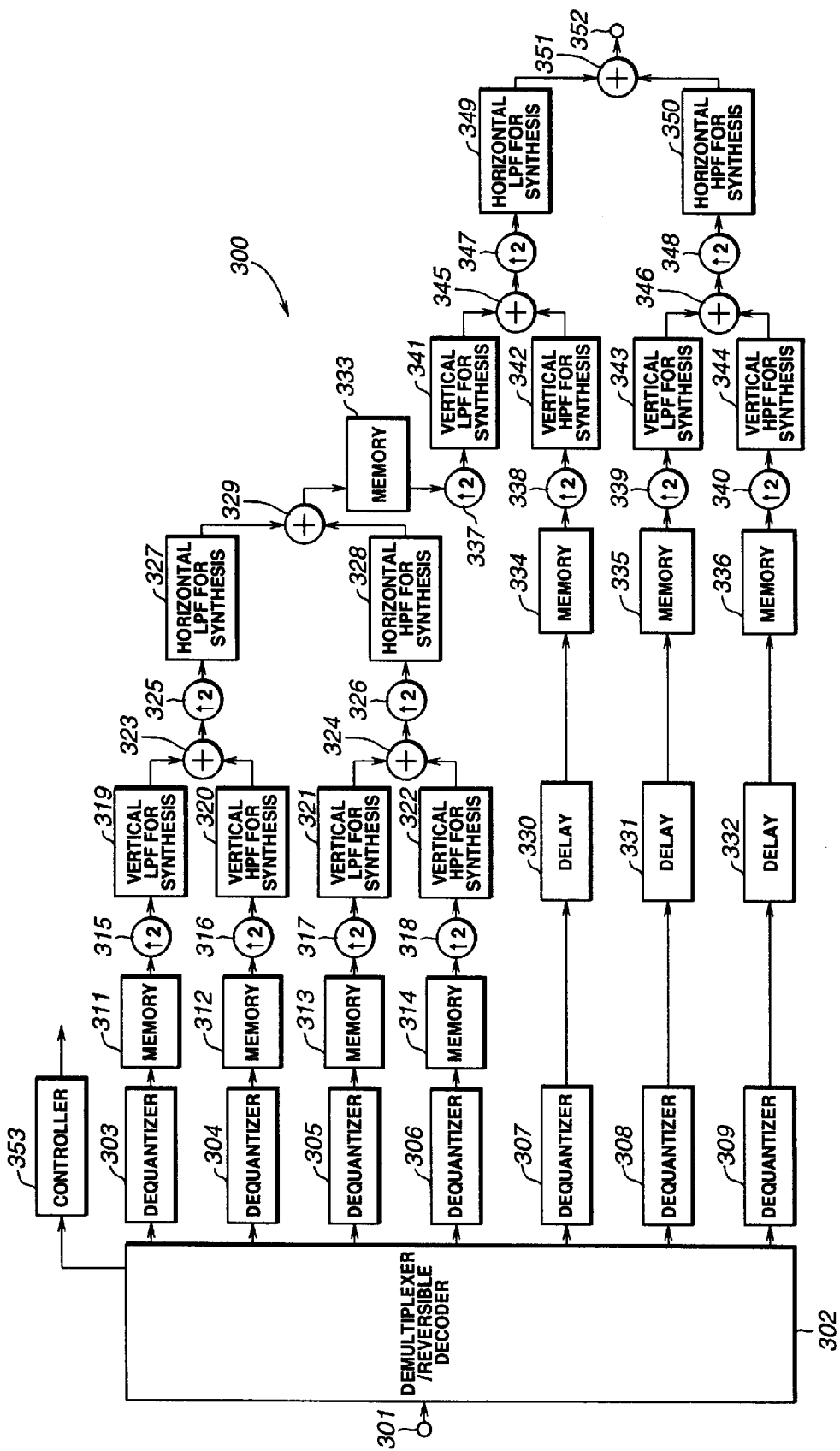
FIG. 2 is a block circuit diagram showing the overall structure of a decoding apparatus embodying the present invention.
Figure 25:
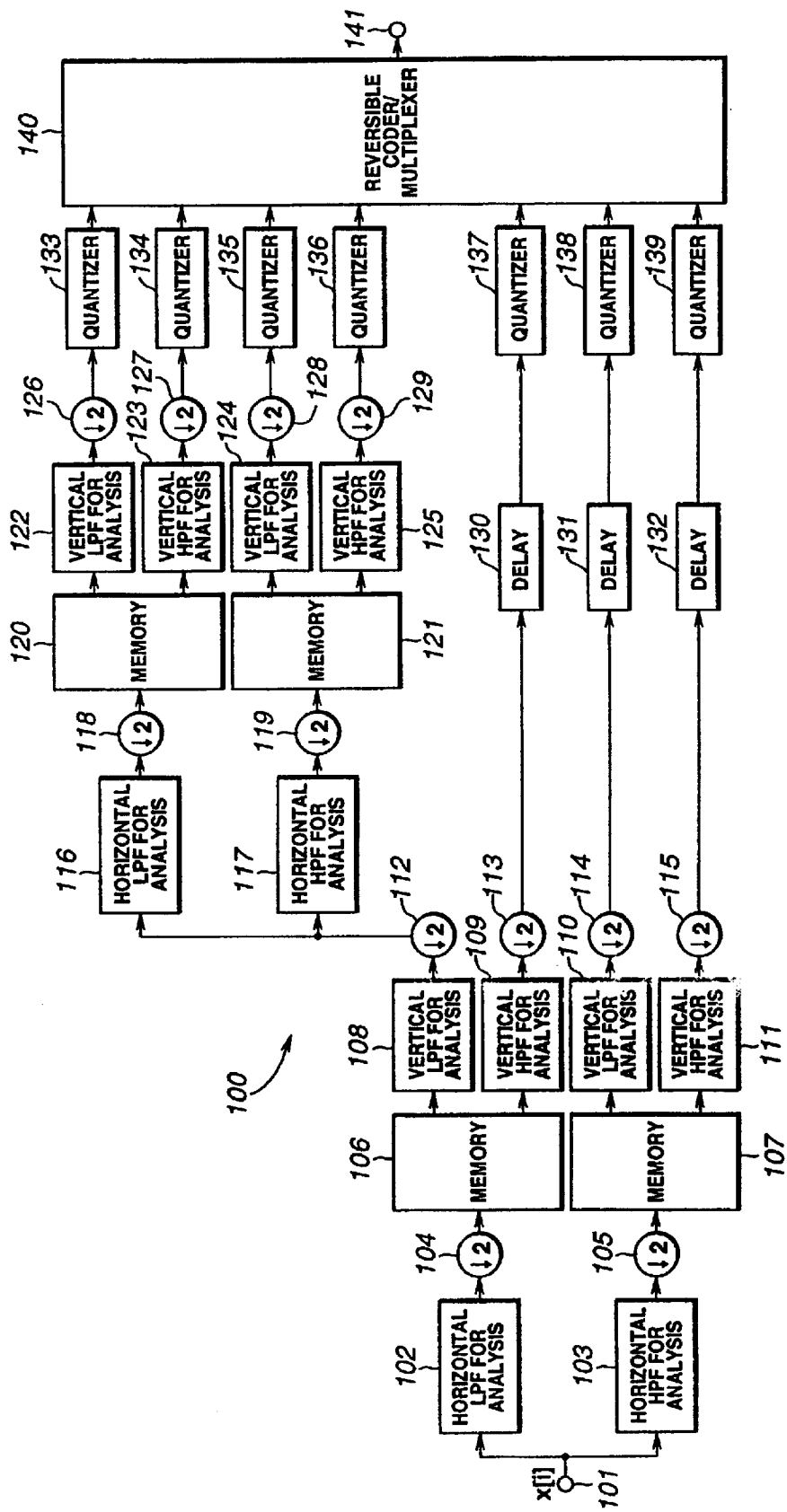
FIG. 25 is a block circuit diagram showing the conventional basic structure of an encoding device of the two-dimensional data string encoding system employing the wavelet transform.
Figure 26:
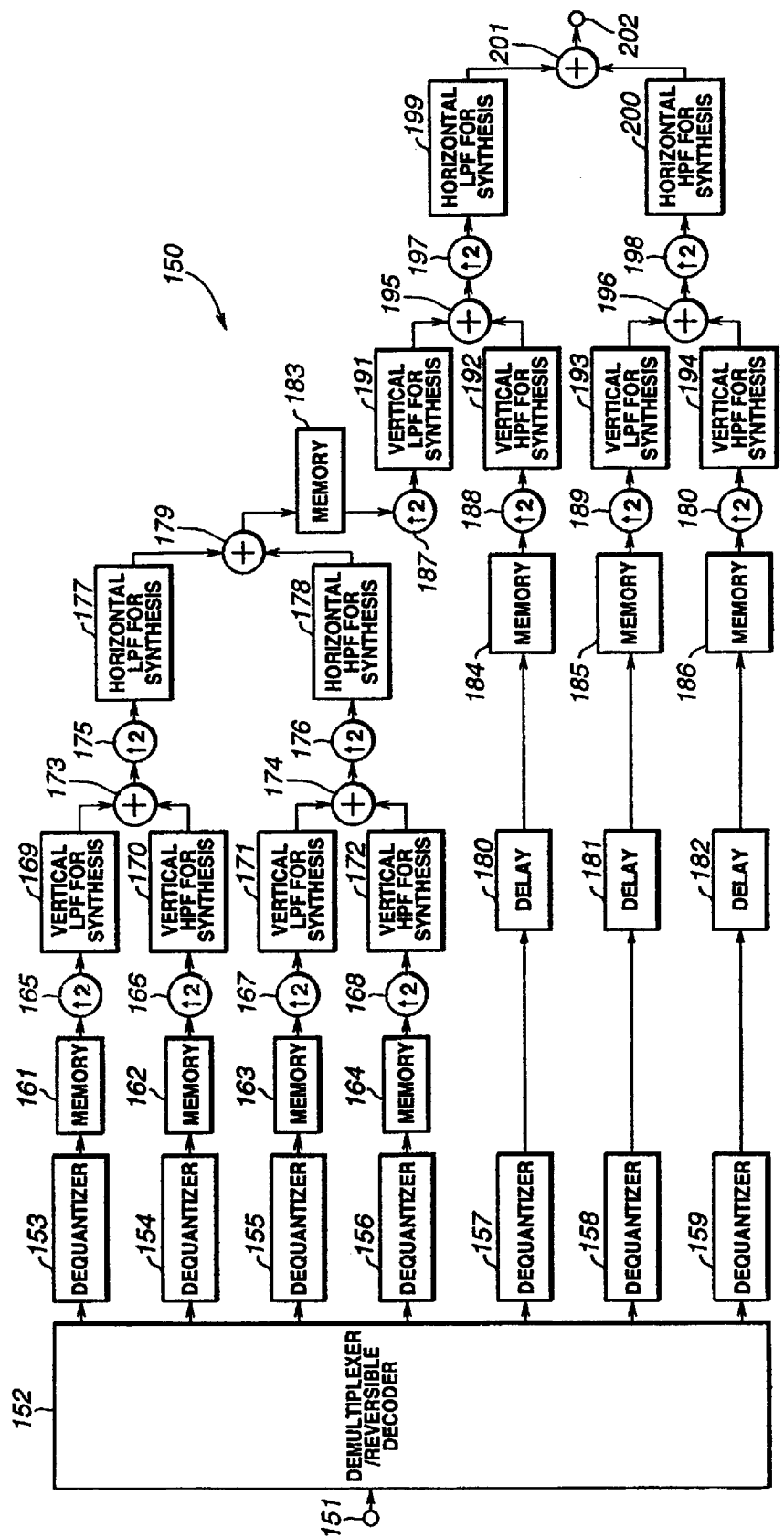
FIG. 26 is a block circuit diagram showing the conventional basic structure of a decoding device of the two-dimensional data string encoding system employing the wavelet transform.

The overall structure of a two-dimensional picture encoding device and decoding device employing wavelet transform according to the present invention is shown in FIGS. 1 and 2. Although the encoding device of the present embodiment shown in FIG. 1 is substantially similar in structure to the encoding device 100 of the conventional system shown in FIG. 25, an encoding device 220 of the present embodiment shown in FIG. 2 differs from the encoding device 100 in that, in the present encoding device 220, the information on the wavelet filter as later explained or the information on arithmetic encoding, such as is used in a decoding device 300 shown in FIG. 2, is generated by a header generator 262 and is appended as the header to a bitstream so as to be outputted at an output terminal 261. In addition, although the overall structure of the decoding device 300 is substantially similar to the structure of the conventional decoding device 150 shown in FIG. 26, the decoding device 300 of the present embodiment differs from the conventional decoding device 150 in that, with the decoding device 300 of the present embodiment, the header information is separated from an output bitstream of the encoding device 220 furnished by the storage medium or the transmission medium and in that a controller 353 executes inverse wavelet transform based on this header information.

The two-dimensional picture encoding device 220, employing the wavelet transform shown in FIG. 1, is explained.

Figure 27:
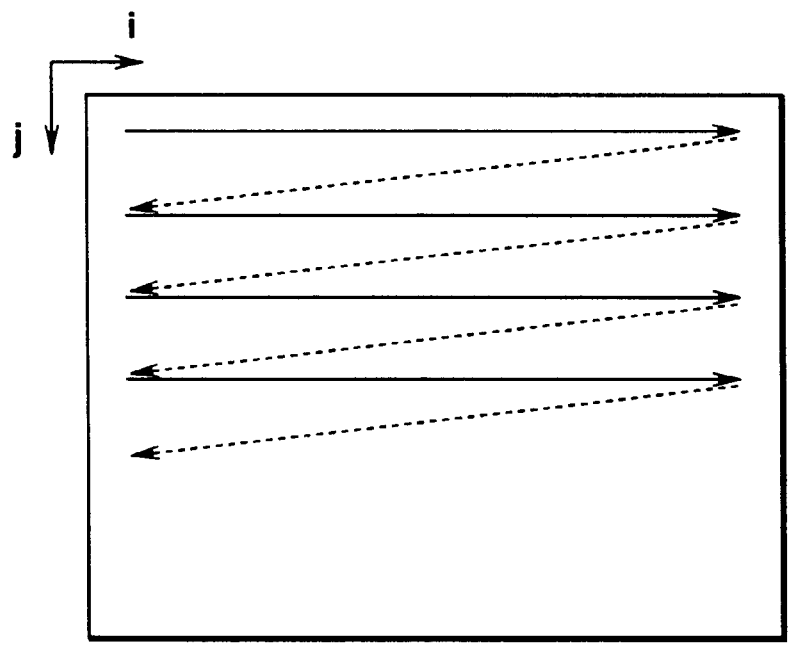
FIG. 27 illustrates the picture scanning direction.

To an input terminal 221 of the encoding device 220 is entered, as an input signal, a data string, obtained on scanning a two-dimensional picture in the sequence shown in FIG. 27. In the illustrative structure of the encoding device of the present embodiment, four filtering operations, that is low-pass filtering and high-pass filtering in the horizontal direction and low-pass filtering and high-pass filtering in the vertical direction, are carried out by way of band splitting in the horizontal and vertical directions on a picture.

Referring to FIG. 1, showing the encoding device 220, an input signal x[i], entering an input terminal 221, is split into a data string of a low frequency band and a data string of a high frequency band by a horizontal low-pass filter for analysis 222 and a horizontal high-pass filter for analysis 223 as analysis filters. In the following description, an output data string from the horizontal low-pass filter for analysis 222 is termed a data string of the first band, while an output data string from the horizontal high-pass filter for analysis 223 is termed a data string of the second band.

The data strings of the first and second bands are subsampled by associated downsampling units 224, 225. The data strings of the first and second bands, subsampled by the downsampling units 224, 225, are stored in associated memories 226, 227, respectively.

The data string of the first band, read out from the memory 226, is band-split in the vertical direction by a vertical low-pass filter for analysis 228 and a vertical high-pass filter for analysis 229. Similarly, the data string of the second band, read out from the memory 227, is band-split in the vertical direction by a vertical low-pass filter for analysis 230 and a vertical high-pass filter for analysis 231. Thus, the memories 226, 227 are line memories for temporarily storing a number of line data required for performing bad splitting in the vertical direction in the downstream side filters, namely the vertical low-pass filter for analysis 228, vertical high-pass filter for analysis 229, vertical low-pass filter for analysis 230 and vertical high-pass filter for analysis 231. In the following description, the output data stream from the vertical low-pass filter for analysis 228 is termed a data string of the third band, the output data stream downstream of the vertical high-pass filter for analysis 229 is termed a data string of the fourth band, the output data stream downstream of the vertical low-pass filter for analysis 230 is termed a data string of the fifth band and the output data stream downstream of the vertical high-pass filter for analysis 231 is termed a data string of the sixth band.

The data strings of the third to sixth bands are further downsampled by associated downsampling units 232, 233, 234, 235, respectively.

It is noted that the data string of the lowermost frequency band, that is the third frequency band, taken out by the vertical low-pass filter for analysis 228 and downsampled by the downsampling unit 232, is further band-split in the horizontal direction by a horizontal low-pass filter for analysis 236 and a horizontal high-pass filter for analysis 237. In the following description, an output data string from the horizontal low-pass filter for analysis 236 is termed a data string of the seventh band and an output data string from the horizontal high-pass filter for analysis 237 is termed a data string of the eighth band.

The data strings of the seventh and eighth bands from the horizontal low-pass filter for analysis 236 and the horizontal high-pass filter for analysis 237 are further downsampled by downsampling units 238, 239 and subsequently stored in memories 240, 241.

The data string of the seventh band, read out from the memory 240, is further band-split in the vertical direction by a vertical low-pass filter for analysis 242 and a vertical high-pass filter for analysis 243. Similarly, the data string of the eighth band, read out from the memory 241, is further band-split in the vertical direction by a vertical low-pass filter for analysis 244 and a vertical high-pass filter for analysis 245. Thus, the memories 238, 239 are also line memories for temporarily storing a number of line data required for performing band splitting in the vertical direction in the downstream side filters 242 to 245. In the following description, the output data stream downstream of the vertical low-pass filter for analysis 242 is termed a data string of the ninth band, the output data stream downstream of the vertical high-pass filter for analysis 243 is termed a data string of the tenth band, the output data stream downstream of the vertical low-pass filter for analysis 244 is termed a data string of the eleventh band and the output data stream downstream of the vertical high-pass filter for analysis 245 is termed a data string of the twelfth band.

The data strings of the ninth to twelfth bands are further downsampled by associated downsampling units 246, 247, 248, 249 respectively, and thence supplied to associated quantizers 253, 254, 255, 256, respectively.

The fourth to sixth data strings from the downsampling units 233, 234, 235 are sent to delay units 250, 252, 252, respectively, for synchronization with the data strings of the ninth to twelfth bands.

The data strings of the fourth, fifth and sixth bands, delayed (synchronized) by these delay units 250, 251, 251, and the data strings from the downsampling units 246, 247, 248, 249, are sent to the associated quantizers 253 to 259 in order to be quantized using respective different quantization steps.

The respective data strings, quantized by the quantizers 253 to 259, are sent to a reversible encoder/multiplexer 260 for loss-free compression employing adaptive arithmetic encoding. Meanwhile, the data encoded here by the arithmetic encoding are wavelet coefficients obtained on wavelet transform and other symbols required in arithmetic decoding.

To the reversible encoder/multiplexer 260 is also supplied the information from the header generator 262. This information is appended as a header to the compressed and multiplexed data string. The data string, having the appended header, is outputted as an output bitstream at an output terminal 261. The header will be explained later in detail.

An output bitstream form the output terminal 261 is recorded on a storage medium or transmitted ver a transmission medium after appendage of the error correction code and predetermined modulation.

The bitstream reproduced from the storage medium or transmitted over the transmission channel is demodulated and corrected for errors so as to be supplied to the decoding device 300 of the present embodiment shown in FIG. 2.

The bitstream from the storage medium or the transmission medium is sent to an input terminal 301 of the decoding device 300 shown in FIG. 2. This input bitstream is sent to a demultiplexer/reversible decoder 302. This demultiplexer/reversible decoder 302 performs an operation which is the reverse of the multiplexing and reversible coding performed by the reversible encoder/multiplexer 260 of the encoding device 220 for restoring the data strings corresponding to the data strings of the fourth to sixth bands and the data strings of the ninth to twelfth bands and for separating the header which is sent to the controller 353. The detailed operation of the controller 353 will be explained subsequently.

Output data strings of the dequantizers 303 to 306 are sent via associated memories 311 to 314 to upsampling units 315 to 318 for upsampling. The upsampled data strings are then interpolated in the vertical direction by associated filters, namely a vertical low-pass filter for synthesis 319, a vertical high-pass filter for synthesis 320, a vertical low-pass filter for synthesis 321 and a vertical high-pass filter for synthesis 322. Thus, the memories 311 to 314 are line memories for temporarily storing a required number of data for interpolation in the vertical direction in the downstream side synthesis filters 319 to 322.

Output data strings of the vertical low-pass filter for synthesis 319 and the vertical high-pass filter for synthesis 320 are summed together by an adder 323, while output data strings of the vertical low-pass filter for synthesis 321 and the vertical high-pass filter for synthesis 322 are summed together by an adder 324.

Output data strings of the adders 323, 324 are upsampled by associated upsampling units 325, 326 and subsequently interpolated in the horizontal direction by associated horizontal low-pass filter for synthesis 327 and horizontal high-pass filter for synthesis 328. Output data strings of the horizontal low-pass filter for analysis 327 and the horizontal high-pass filter for analysis 328 are summed together by an adder 329 and stored in a memory 333. The data string read out from the memory 333 is upsampled by an upsampling unit 337 and then interpolated in the vertical direction by a vertical low-pass filter for synthesis 341. Thus, the memory 333 is a line memory for temporarily storing a number of line data required for performing interpolation in the vertical direction by the downstream side vertical low-pass filter for synthesis 341.

Output data strings of the dequantizers 307 to 309 are similarly upsampled via associated memories 334 to 336 by upsampling units 338, 339 and thence supplied to associated vertical high-pass filter for synthesis 342, vertical low-pass filter for synthesis 343 and the vertical high-pass filter for synthesis 344. It is noted that the data strings sent to the vertical high-pass filter for synthesis 342, vertical low-pass filter for synthesis 343 and the vertical high-pass filter for synthesis 344 are delayed by delay units 330 to 332 in order to realize synchronization between the interpolation by the filters 342 to 344 and that by the vertical low-pass filter for synthesis 341. Meanwhile, the memories 334 to 336 are line memories for temporarily storing a number of line data required for performing interpolation in the vertical direction by the downstream side filters, namely the vertical high-pass filter for synthesis 342, vertical low-pass filter for synthesis 343 and the vertical high-pass filter for synthesis 344.

The data string from the vertical low-pass filter for synthesis 341 and the data string from the vertical high-pass filter for synthesis 342 are summed together by an adder 345, while the data string from the vertical low-pass filter for synthesis 343 and the data string from the vertical high-pass filter for synthesis 344 are summed together by an adder 346. The data strings from these adders 345, 346 are upsampled by upsampling units 347, 348 and interpolated in the horizontal direction by a horizontal low-pass filter for synthesis 349 and a horizontal high-pass filter for synthesis 350 so as to be then summed together by an adder 351 to regenerate a data string. This regenerated data string is approximately the same as the input data string to the encoding device 220 of FIG. 1 and is outputted at an output terminal 352.

In the configuration of FIGS. 1 and 2, downsampling units 232 to 235 and 246 to 249 in the encoding device 220 perform downsampling on the picture in the vertical direction, that is decimation every other line. Conversely, upsampling units 315 to 318 and 337 to 340 in the decoding device 300 perform processing of inserting one all-zero lines between neighboring input lines.

The header information is now explained.

In the present embodiment, the first form of the header information generated by the header generator 262 of the encoding device 220 and sent to the decoding device 300 is the information shown for example in FIG. 3. It is assumed that the filter is a linear phase FIR (finite impulse response) filter.

The 1-bit flag (default/download) in the header shown in FIG. 3 is 0 if a default filter pre-set in the decoding device

300 is used for filtering and is 1 if the information on a wavelet filter sent on appendage to a bitstream from the encoding device 220 is used for filtering. The information on the wavelet filter is sent only if this flag (default/download) is 1.

The information represented by NL and NH in FIG. 3 is the information representing the number of taps of the low-pass filters for synthesis and that of the high-pass filters for synthesis in the decoding device 300. If the filter has coefficients up to 9 taps, 4 bits are required as the information on the numbers of taps NL, NH. In consideration that there is in general no filter with 0 or 1 tap, the information on the number of taps NL or NH may be set to (number of filter taps −2). In this case, filters up to a maximum of 17 taps can be specified by 4 bits.

The information represented by DL and DH in FIG. 3 is the phase shift information in case of applying filtering of a low-pass filter for synthesis and a high-pass filter for synthesis to a data string in the decoding device 300 and is equivalent to the delay in the linear phase filter. The group delay is an integer if the number of taps represented by NL or NH is odd, while the group delay is an odd number/2 if the number of taps is even. Thus, the value of the phase shift DL or DH is set as indicated by the following equation (13):

$$DX = \begin{cases} gds & NX = 2m+1 \\ gds \times 2 & NX = 2m \end{cases} \quad (13)$$

where NX=NL or NH and DX=DL or DH.

For example, 1 bit can be used for DL, so that the group delay is 0 or 1 for an odd-numbered tap and is 0 or 0.5 for an even-numbered tap.

The information represented by Lcoef0, Lcoef1, ..., Hcoef0, Hcoef1, ... is the information specifying filter coefficients of the low-pass filter for synthesis and the high-pass filter for synthesis in the decoding device 300. If the wavelet filter used is limited to a symmetrical type or anti-symmetrical type, the number of independent filter coefficients is equal to the number of taps/2 or to the (number of taps +1)/2 if the number of taps is even or odd, respectively. Thus, only the filter coefficient of the number is sent.

The symmetrical type filter is such a filter whose filter coefficient satisfies the equation (14):

$$cX(i)=cX(NX-i-1) \quad (14)$$

On the other hand, the anti-symmetrical type filter is a filter whose filter coefficient satisfies the equation (15):

$$cX(i)=-cX(NX-i-1) \quad (15)$$

In the above equations, cX(i) is a filter coefficient of a low-pass filter for synthesis and a filter coefficient of a high-pass filter for synthesis and is cL(i) with X=L for the low-pass filter for synthesis while being cH(i) for the low-pass filter for synthesis. In the above equation, NX is the number of taps of the low-pass filter for synthesis and the number of taps of the high-pass filter for synthesis. In the case of the low-pass filter for synthesis, NX is NL, with X=L, whereas, in the case of the high-pass filter for synthesis, NX is NH, with X=H.

Figure 4:
FIG. 4 illustrates the representation of wavelet coefficients on the stream of the header information.

The filter coefficients can be represented on a bitstream as shown for example, in FIG. 4, where M and E denote a significant figure of the filter coefficient and an exponential number, respectively. Using these values, the actual coefficients can be calculated as shown by the equation (16):

$$cX(i)=M \times 10E \quad (16)$$

For providing a significant figure of 7 digits, the significant figure of the filter coefficient M is represented by 25 bits. In addition, by according 5 bits to the exponential E, an exponential E in a range of −16≦E≦15 can be represented.

For downloading the filter coefficients for synthesis of FIG. 2 to the decoding side, a sum total of 291 bits are required, as shown in FIG. 5.

The sequence of operations for setting the method of inverse wavelet transform in the decoding device 300 of the present embodiment based on the header information in the bitstream as described above is explained with reference to a flowchart of FIG. 6. The processing of this sequence of operations is performed by a controller 353 of the d300 of FIG. 2.

First, at step ST11, the header information separated by the demultiplexer/reversible decoder 302 from the bitstream is sent to the controller 353. The controller 353 then reads the flag (default/download) at step ST12 from the header information and then proceeds to step ST13. The controller 353 then judges at step ST13 whether or not the flag value is 0 or 1. If the flag value is 0, the controller proceeds to step ST14 to send the pre-set filter coefficient to the respective wavelet filters for synthesis, that is the high-pass filters for synthesis and low-pass filters for synthesis, in order to effect the inverse wavelet transform by these pre-set wavelet filters for synthesis. On the other hand, if the value of the flag (default/download) is 1, the controller proceeds to step ST15 where the controller deems the succeeding bit string in the header information shown in FIG. 3 as indicating the information on the wavelet filter and sequentially reads the bit string.

The controller 353 then proceeds to step ST16 to set the number of filter coefficients to be read for the number of taps NL or NH. The controller also sets three parameters eB, eE and sym, which define the method of extrapolation required when applying the group delay gds of the filter and the convolution processing to the trailing end of the data string, in the following manner.

In setting the group delay gds, the controller 353 reads the succeeding information DL or DH of the flag (default/download) in order to calculate the group delay gds, responsive to the number of filter taps NL or NH, by the following equation (17):

$$gds = \begin{cases} DX & NX = 2m \\ DX/2 & NX = 2m+1 \end{cases} \quad (17)$$

where NX=NL or NH and DX=DL or DH.

In determining folding parameters in convolution processing, the controller 353 calculates group delay gds and the two parameters eB and eE, defining the method for folding applied to the leading and trailing ends of the data string by the numbers of filter taps NL or NH, in accordance with the following equation (18):

$$eY=abs(dY+gds+dDY) \quad (18)$$

$$eY=eB \text{ or } eE,$$

$$dY=dB \text{ or } dE,$$

$$dDY=dDB \text{ or } dDE$$

where dB and dE denote distance between the symmetrical center position produced by extrapolation for the leading end or trailing end position performed on the analysis side (encoding device side) and the leading end data or the trailing end data. The values of dB and dE can be uniquely determined by the number of filter taps used on the analysis side (encoding device side). However, since the number of taps of the low-pass filter for analysis is equal to the number of taps of the high-pass filter for synthesis or the number of taps of the low-pass filter for synthesis, as may be seen from the designing methods for a QMF (quadrature mirror filter) or a SSKF (symmetric short kernel filter), the values of dB and dE are found from the numbers of taps of the filters for synthesis NL or NH as may be seen from Table 1 shown in FIG. 7. Also, dDB and dDE are changes in the distance between the leading end data or the trailing end data and the symmetrical center position, caused by downsampling on the analysis side or the encoding device side. If downsampling is defined for perpetually saving the leading end data of the data string, dDB=0 and dDE=1.

Also, the group delay gds, which is the group delay of the filter for analysis on the encoding device side, is obtained on inverting the sign of the group delay gds of the filter for synthesis on the decoder side, that is, can be found as shown in the equation (19):

$$gds=-gds \qquad (19)$$

Next, symmetry of the wavelet filter used for analysis on the encoding device side is the information required in extrapolation. The controller 353 finds this information from the number of taps of the filter for synthesis in the following manner.

That is, the filter coefficient of a low-pass filter always satisfies the equation (14) without regard to the number of taps. Thus, the low-pass filter for analysis is always symmetrical. On the other hand, the high-pass filter is symmetrical and anti-symmetrical if its number of taps is odd or even, respectively. Since the number of taps of the high-pass filter for analysis is equal to the number of taps NL of the low-pass filter for synthesis, symmetry of the high-pass filter for analysis can be judged from NL. If the number of taps NL is odd, that is if the high-pass filter for analysis is symmetrical, the parameter sym is set to 1, whereas, if the number of taps NL is even, that is if the high-pass filter for analysis is anti-symmetrical, the parameter sym is set to −1.

The controller 353 then proceeds to step ST17 to judge whether the number of taps NL or NH is odd. If the number of taps NL or NH is odd, the controller proceeds to step ST18 to read (NL+1)/2 or (NH+1)/2 filter coefficients. Since both the low-pass filters and high-pass filters are symmetrical, a set of all coefficients can be obtained by employing the relation of the equation (14). If the number of taps NL or NH is even, the controller 353 proceeds to step ST19 to read NL/2 or NH/2 filter coefficients. Since the low-pass filter and the high-pass filters in this case are symmetrical and anti-symmetrical, respectively, the set of all coefficients is given by the equations (14) or (15).

The controller 353 then proceeds to step ST20 where the group delay gds, extrapolation parameters eB, eE and the filter coefficients Lcoef, Hcoef are entered from the controller 353 to the respective filters. The decoding device 300 performs inverse wavelet transform in the following manner based on the input group delay gds, extrapolation parameters eB, eE and the filter coefficients Lcoef, Hcoef.

First, by way of the extrapolation, the decoding device 300 performs folding in the vicinity of both ends (leading and trailing ends) of the input data string, in order to extrapolate data lacking in convolution processing as later explained. It is noted that x(i) is the value of data at a position i, with the input data being x(0), x(1), . . . , x(N-1), with the position i being an index accorded to the down-sampled data string. SymB(i) and SymE(i) are functions given by the equations (20) and (21) and calculate the positions in the data string corresponding to the position i in the vicinity of the leading and trailing ends.

$$SymB(i)=-i -eB \qquad (20)$$

$$SymE(i)=2N -i-2+eE \qquad (21)$$

Figure 8:
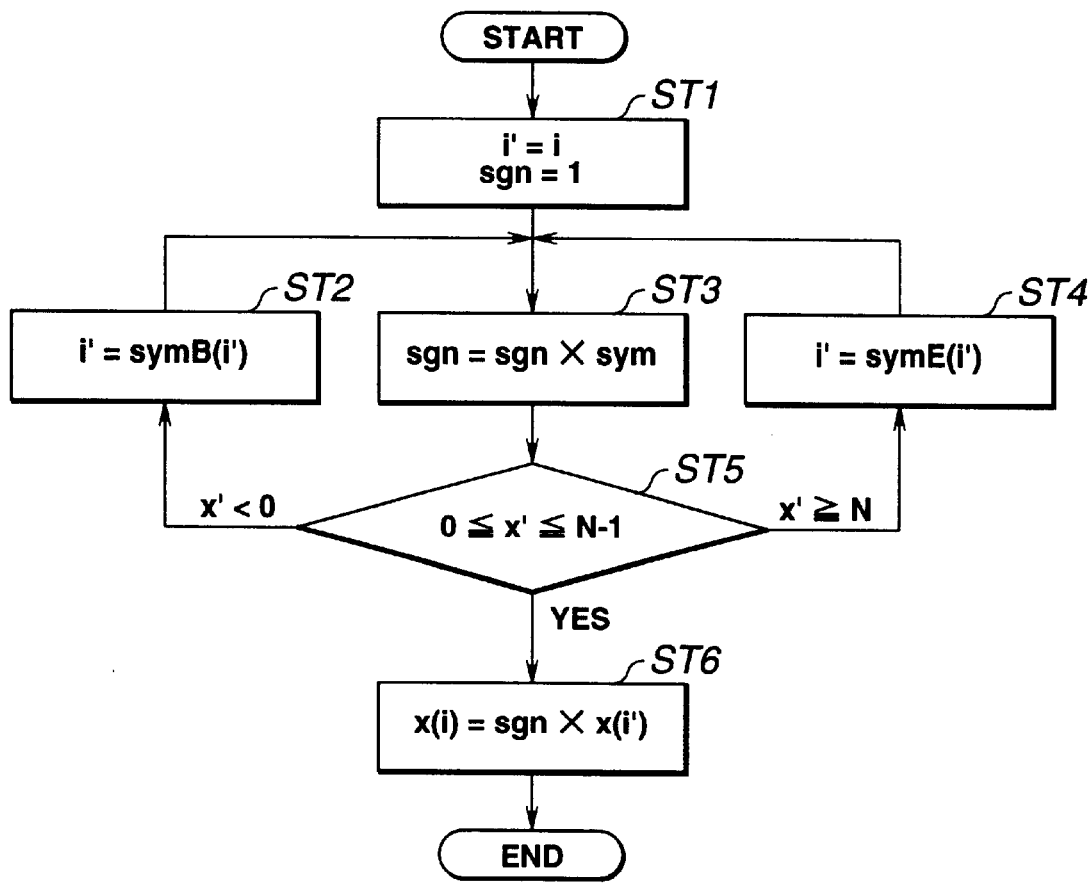
FIG. 8 is a flowchart for illustrating folding.

Specifically, the position i and the variable sgn are initialized at step ST1 in FIG. 8, before the controller 353 proceeds to step ST3. At this step ST3, sgn X sym is found as variable sgn, before the controller proceeds to step ST5. At this step ST5, it is judged whether or not 0≦x'≦N-1, using output data x'. If x'<0, the controller proceeds to step ST2 to set i' to SymB(i') at step ST2 before the controller reverts to step ST3. If x'≧N, the controller proceeds to step ST4 where i' is set to SymE(i') before the controller reverts to step ST3. If 0≦x'≦N-1, the controller sets x(i)=sgn X x(i') at step ST6 to terminate extrapolation.

Next, by way of upsampling, the decoding device 300 inserts 0s between data of the data string inclusive of extrapolated data, in accordance with a pre-set method.

Then, by way of convolution processing, the decoding device 300 performs convolution employing a filter with a group delay gds in accordance with the following equation (22):

$$y(k) = \sum_{i=-\frac{NX-1}{2}+gds}^{\frac{NX-1}{2}+gds} cX\left(i+\frac{NX-1}{2}-gds\right)x(k-i) \qquad (22)$$

where i=0, 1, 2, . . . , NX-1, with NX=NL or NH and cX=cL or cH.

Although it is assumed in the present embodiment to set a set of default filters, the flag (default/download) can be represented by 2 or more bits to set plural default filters.

In the flowchart of FIG. 8, calculations of sgn=sgn X sym are always performed. However, since the low-pass filter is always symmetrical, these calculations can be performed only for the high-pass filter.

In addition to the first embodiment of the header information, shown in FIG. 3, the second embodiment of the header information, shown in FIG. 9, may also be used as the header information of the present invention.

The second embodiment of the header information, substantially similar to the first embodiment of the header information, differs from the first embodiment in that calculations of the folding parameters by the equation (18) are performed by the header generator 262 of the encoding device 220 and the calculated values are appended to an output bitstream so as to be transmitted in this form to the decoding device 300. That is, the second embodiment of the header information is as shown in FIG. 9, in which eBL and eEL are folding parameters at the leading end position and the trailing end position by the low-pass filter for synthesis, while eBH and eEH are folding parameters for defining the folding method for the leading end position and the trailing end position by the high-pass filtering for synthesis. Since the folding parameters assume the values of 0 or 1, one bit suffices for representing the folding parameters.

The decoding device 300 substitutes the folding parameters in the header information appended to the bitstream and sent in this form thereto directly into the equations (20) and (21) by way of folding processing. This omits the processing for setting the folding parameter at step ST16 in the flowchart shown in FIG. 6.

As a third embodiment of the header information of the present invention, the header information shown in FIG. 10 may be used.

The header information of the third embodiment is the header information of the second embodiment of FIG. 10 to which is appended the parameter sym representing symmetry of the high-pass filter for analysis. The parameter sym can assume a value 1 or −1 and hence can be represented by one bit.

The decoding device 300 in this case executes the processing shown in the flowchart of FIG. 8 using the value of the parameter sym in the header information appended to the bitstream and sent in this form. This omits the processing by the controller 353 of the decoding device 300 of step ST16 of the flowchart shown in FIG. 6.

As the fourth embodiment of the header information, the header information shown in FIG. 11 may be used.

The header information of the fourth embodiment is the header information of the third embodiment of FIG. 10 to which is further appended a 2-bit flag c_type representing the method for representing the filter coefficient of the downloaded filter. The value of the flag c_type is 0, 1 or 2 if the wavelet coefficient is a real number, an integer or (an integer/power of 2), respectively.

If the filter coefficient is represented by a real number, that is if the flag c_type is 0, each filter coefficient is divided to a mantissa portion and an exponential portion and recorded in this form on a bitstream, as in the case shown in FIG. 4. If the filter coefficient is represented by an integer, that is if the flag c_type is 1, its value is represented only by the mantissa portion M of FIG. 4, while the bit string for the exponential portion E is not outputted.

The bitstream in case the filter coefficient is represented by (an integer/power of 2), the form of representation is similar to that of FIG. 4, however, its mantissa portion and exponential portion represent an integer of a numerator and the number of the power of the denominator, respectively. That is, the actual filter coefficient is configured as shown in the following equation (23):

$$cX(i)=M/2E \quad (23)$$

Figure 6:
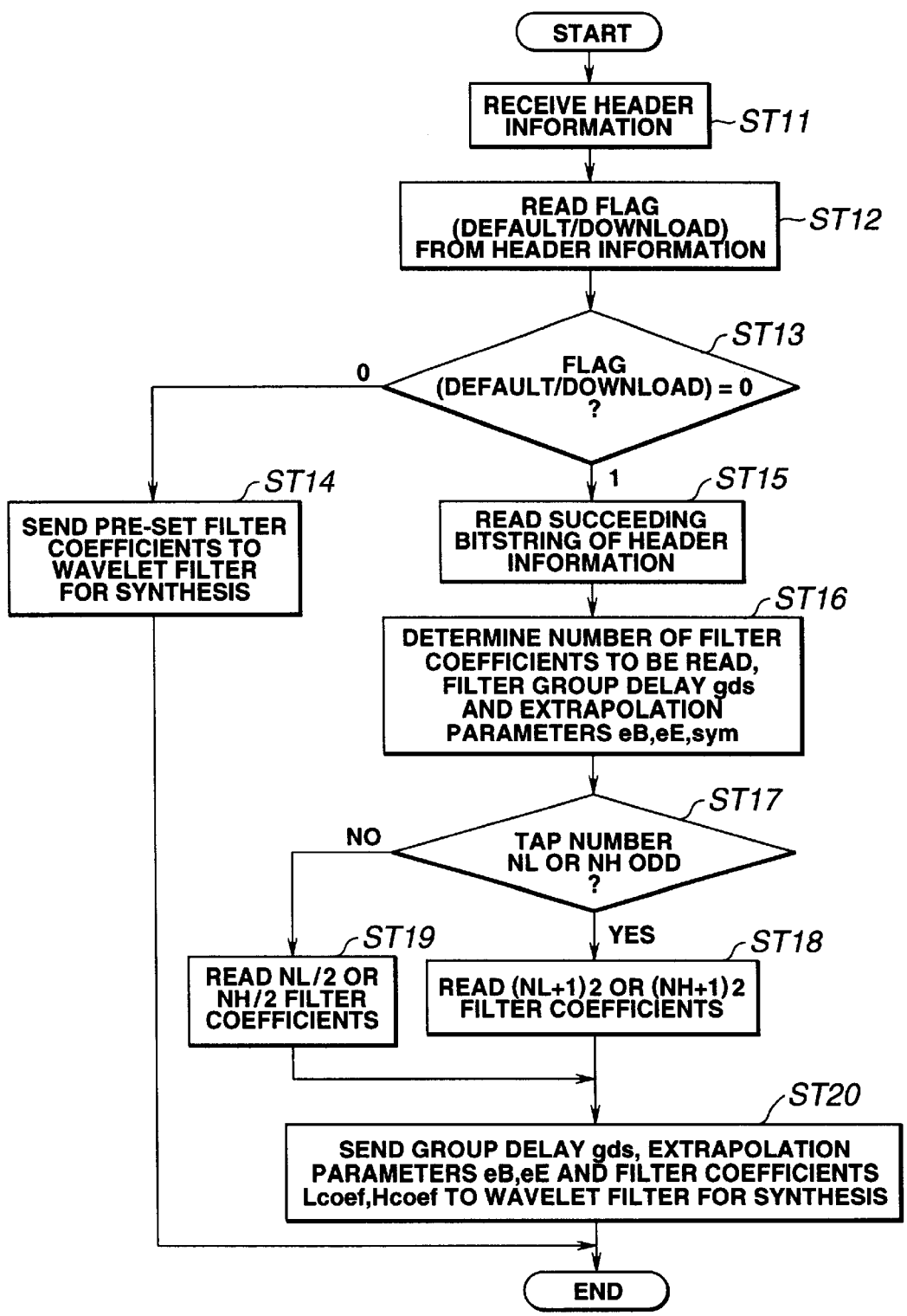
FIG. 6 is a flowchart for illustrating the operation of a controller of a decoding apparatus according to a first embodiment of the present invention.
Figure 21:
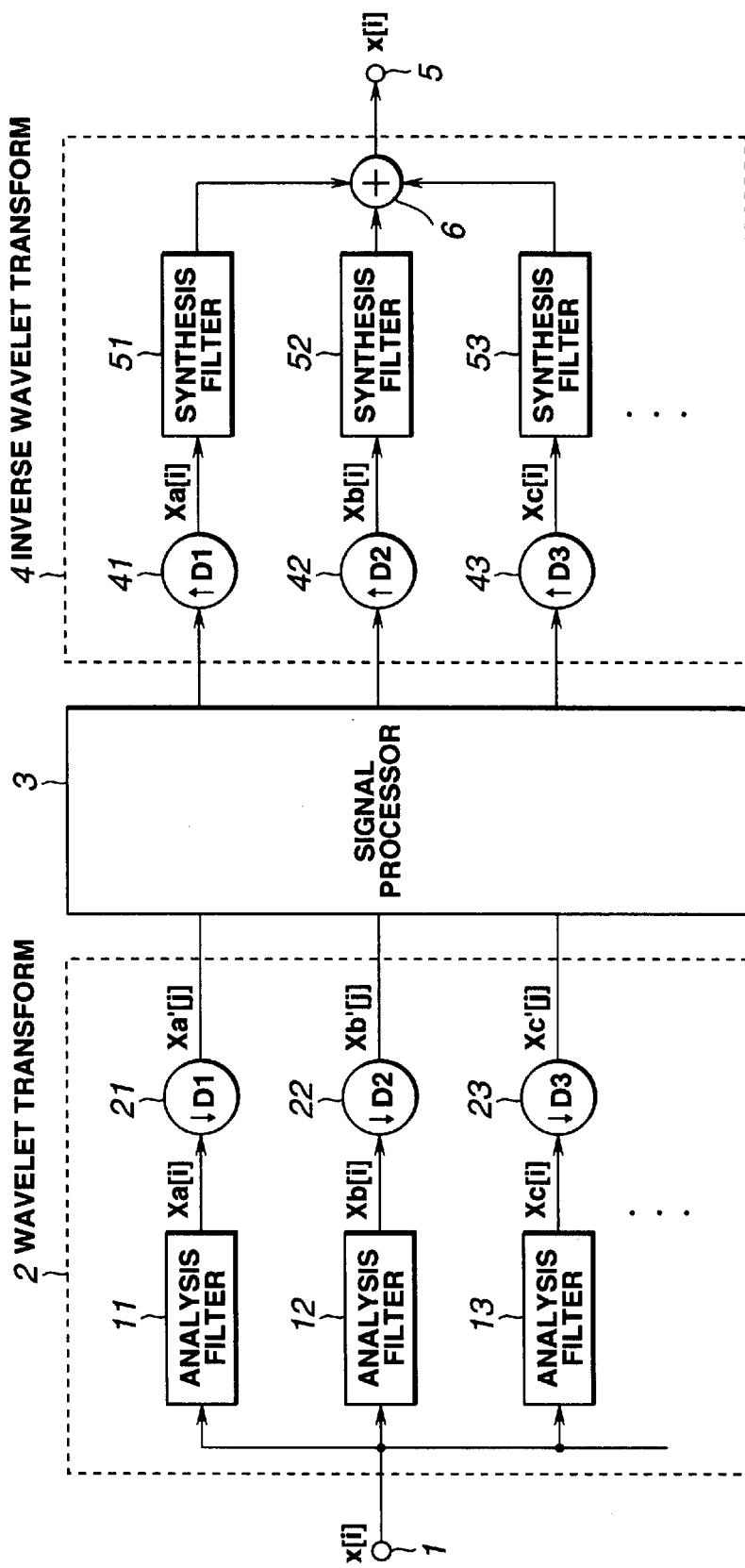
FIG. 21 is a block circuit diagram showing a structure for illustrating the principle of the wavelet splitting and synthesis.
Figure 23:
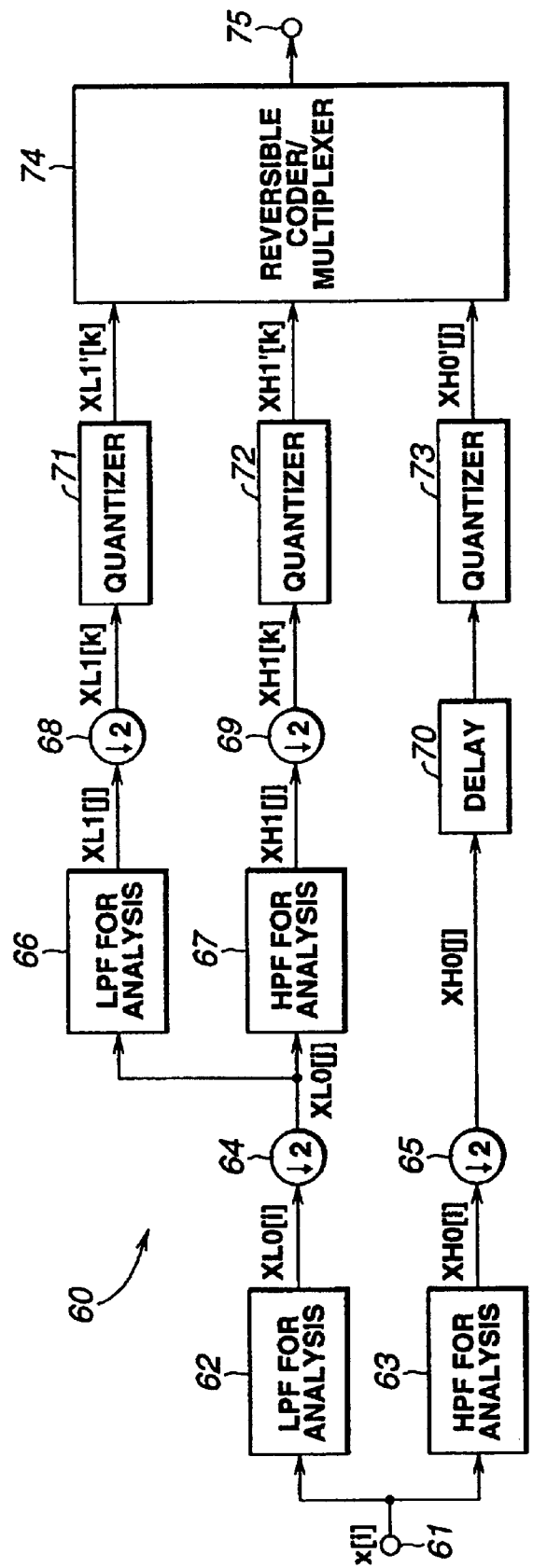
FIG. 23 is a block circuit diagram showing the conventional basic structure of an encoding device of a one-dimensional data string encoding system employing the wavelet transform.
Figure 24:
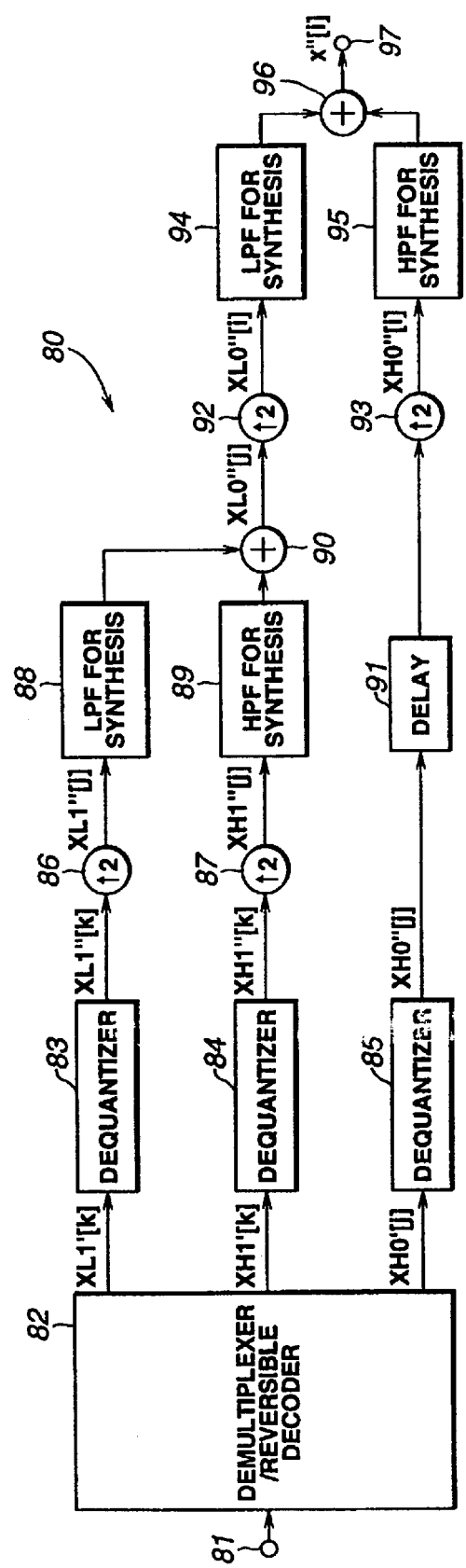
FIG. 24 is a block circuit diagram showing the conventional basic structure of a decoding device of a one-dimensional data string encoding system employing the wavelet transform.

In this case, the controller 353 of the decoding device 300 scrutinizes this flag c_type at step ST12 of FIG. 6 in order to describe the manner of representation of the filter coefficient. Meanwhile, the number of bits allocated to the mantissa part M and the exponential part E can be varied depending on the value of the flag c_type, namely the manner of filter representation. For example, the filter shown in FIG. 21, that can be represented in the form of (an integer part/power of 2), as shown in FIG. 12, this filter can be represented by 6 bits and 3 bits for the mantissa part and for the exponential part, respectively. If 10 and 4 bits are allocated for the mantissa and exponential parts, respectively, on the assumption that different filters are used, 16 bits per filter coefficient can be curtailed as compared to the case shown in the first embodiment.

As the header information of the fifth embodiment of the present embodiment, the header information shown in FIG. 13 may be used.

The overall structure of the encoding device 220 in the case of the fifth embodiment is similar to that shown in FIG. 1. However, the header generator 262 of the encoding device 220 generates the information on the arithmetic encoding shown in FIG. 13. Thus, the decoding device 300 of the present embodiment performs arithmetic decoding of the wavelet coefficient based on the information on the arithmetic encoding appended to the bitstream as the header. It should be noted that the wavelet coefficients are classed into K groups thought to have different statistic properties and are processed with arithmetic encoding using different models. It is assumed that default alphabetical sizes, namely the maximum possible values of data for arithmetic encoding, are set for these models. Such grouping may be made as an example based on frequency bands to which belong the coefficients. In the wavelet splitting, shown in FIG. 1, three different frequency bands, inclusive of the minimum frequency band, are generated, so that K=3 and hence three different models are used. In FIG. 13, a flag (alp_size_download) has one bit for indicating whether or not the alphabetical size is to be downloaded. If, in the encoding device 220, the default alphabetical size set in common with the decoding device 300 is used, the value of the above flag is set to 0, whereas, if the alphabetical size other than the default value is used, the above flag is set to 1, and the alphabetical size of K actually used for each model is outputted on the succeeding bitstream.

Figure 14:
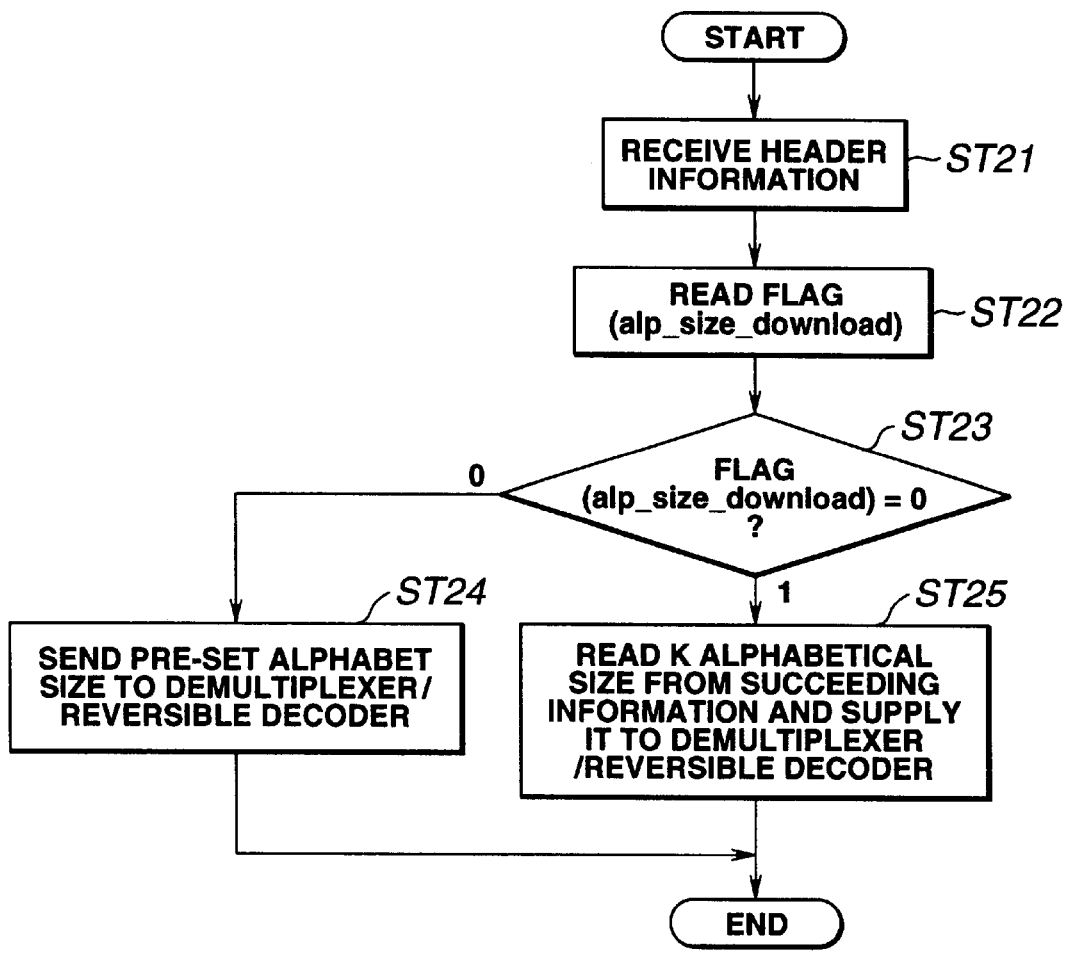
FIG. 14 is a flowchart for illustrating the operation of a controller of a decoding apparatus according to a fifth embodiment of the present invention.

The information represented by alp_size_0, alp_size_1, . . . , alp_size_(K-1) in FIG. 13 is present only if the flag (alp_size_download) is 1 and specifies the alphabetical size for each model. The sequence of operations determining the method of arithmetical decoding of the inverse wavelet coefficients in the decoding device 300 of the present embodiment based on the header information in the above bitstream is explained with reference to a flowchart shown in FIG. 14. This sequence of operations is performed by the controller 353 of the decoding device 300 of FIG. 2.

First, if the header information separated from the bitstream by the demultiplexer/reversible decoder 302 is sent to the controller 353 at step ST21, the controller 353 of the decoding device 300 reads the flag (alp_size_download) at step ST22 to proceed to step ST23. The controller 353 then judges at step ST23 whether or not the flag value is 0 or 1. If this value is 0, the controller proceeds to step ST24 to send a pre-set alphabetical size to the demultiplexer/ reversible decoder 302 in order to execute arithmetic decoding of the wavelet coefficients. If this flag is 1, the controller proceeds to step ST25. The controller reads the K alphabetical sizes from the information succeeding to the flag to send these to the demultiplexer/ reversible decoder 302 in order to perform arithmetic decoding of the wavelet coefficients.

In the controller 353 of the decoding device 300, is previously set which model is to be associated with the sequentially downloaded alphabetical sizes.

The manner of classification of the wavelet coefficients or the number of models can be set arbitrarily if these are set in common on the encoding device side and on the decoding device side.

Although an example of arithmetic encoding of the wavelet coefficients is illustrated herein, the arithmetic encoding can also be applied to other symbols so that the alphabetical size can be downloaded in a similar manner if the possible range of the symbol is varied with e.g., input pictures.

As the sixth embodiment of the header information according to the present invention, such header information as is shown in FIG. 15 may also be used.

The header information of the present sixth embodiment is substantially similar to that of the fifth embodiment shown in FIG. 13. The point of difference in the header information of the present sixth embodiment is that the number of models of downloading the alphabetical size is used in place of the flag (alp_size_download). It is also assumed that the rank of priority is previously set in each model. If different models are used for respective frequency bands, as explained in connection with the fifth embodiment, a higher priority ranking can be accorded to models of lower frequency bands.

In FIG. 15, model_num denotes the information on the number of models for downloading the alphabetical size and signifies that a number of the alphabetical sizes specified by the model_num is arrayed as the trailing side information. This value need not be equal to the total number of models K and is only sufficient if it is not larger than K. The alphabetical size is downloaded only for the models of the number specified by the number of models model_num beginning from the higher side of the priority ranking while default alphabetical size is used for other models of lower priority ranking. If the number of models model_num is 0, the default alphabetical sizes are used for all models, whereas, if the number of models model_num is K, the alphabetical size of all models are downloaded.

In the drawings, alp_size_0, alp_size_1, . . . , alp_size_ (model_num-1) are present only for the number of models model_num not less than 1 and denote the alphabetical size for the respective models.

Figure 16:
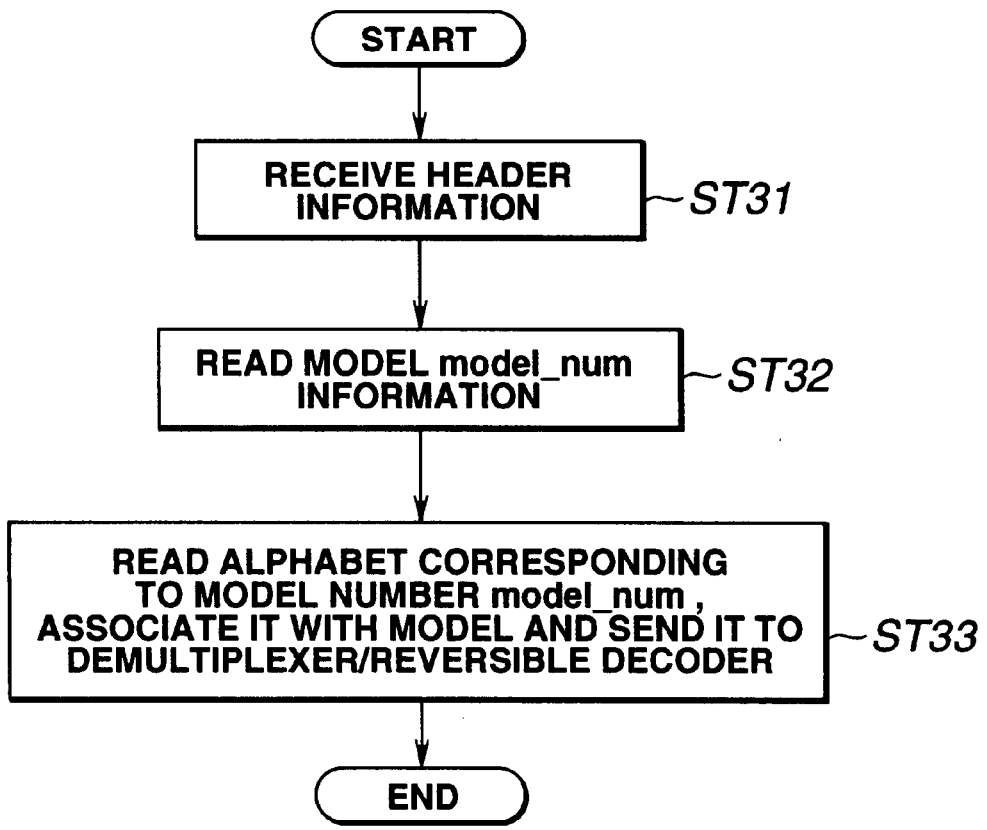
FIG. 16 is a flowchart for illustrating the operation of a controller of a decoding apparatus according to the sixth embodiment of the present invention.

The sequence of operations for determining the method of arithmetic decoding of inverse wavelet coefficients in the decoding device 300 of the present embodiment, based on the header information in the above-described bitstream, is explained with reference to the flowchart of FIG. 16. The processing of the sequence of operations is performed by the controller 353 of the decoding device 300 of FIG. 2.

If, at step ST3 1, the header information separated by the demultiplexer/reversible decoder 302 from the bitstream is sent to the controller 353 of the decoding device 300, the controller 353 reads the information on the number of models model_num from the header information at step ST32. The controller 353 then proceeds to step ST33 to read the corresponding number of the alphabetical sizes from the trailing side information to associate the values with the models in the order of the decreasing priority ranking. In the models in which the alphabetical sizes have been downloaded, the values are sent to the demultiplexer/reversible decoder 302. In the other models with lower priority ranking values, default alphabetical sizes are sent to the demultiplexer/reversible decoder 302 in order to effect decoding of the wavelet coefficients.

The priority ranking for the respective models can be set arbitrarily, if only these are set in common for the encoding device side and the decoding device side.

As the seventh embodiment of the header information according to the present invention, such header information as is shown in FIG. 17 may also be used.

The header information of the present seventh embodiment is substantially similar to that of the sixth embodiment shown in FIG. 15. The point of difference in the header information of the present seventh embodiment is that a 1-bit flag (hist-init_type) specifying the method for initialization of a histogram used for monitoring the occurrence probability of each symbol is appended to the header information. In the encoding device 220 and the decoding device 300, there are previously set two sorts of the initialization methods in association with respective values of the flag (hist-init_type). For example, if the flag (hist-init_type) is 0, the histogram is initialized so that all symbols will be of equal probability. That is, the histogram of the m'th priority ranking is initialized in accordance with the following equation (24):

$$Hm(i)=1 \quad i=0, 1, \quad (24)$$

On the other hand, if the flag (hist-init_type) is 1, the histogram is initialized in another pre-set method. As this other initializing method, it may be contemplated to accord different occurrence probability values for each symbol:

$$Hm(i) = \begin{cases} A & i=0 \\ B & i=1 \\ C & i=2 \\ D & i>2 \end{cases} \quad (25)$$

In the above equation, A, B, C and D denote constants of different values.

Figure 18:
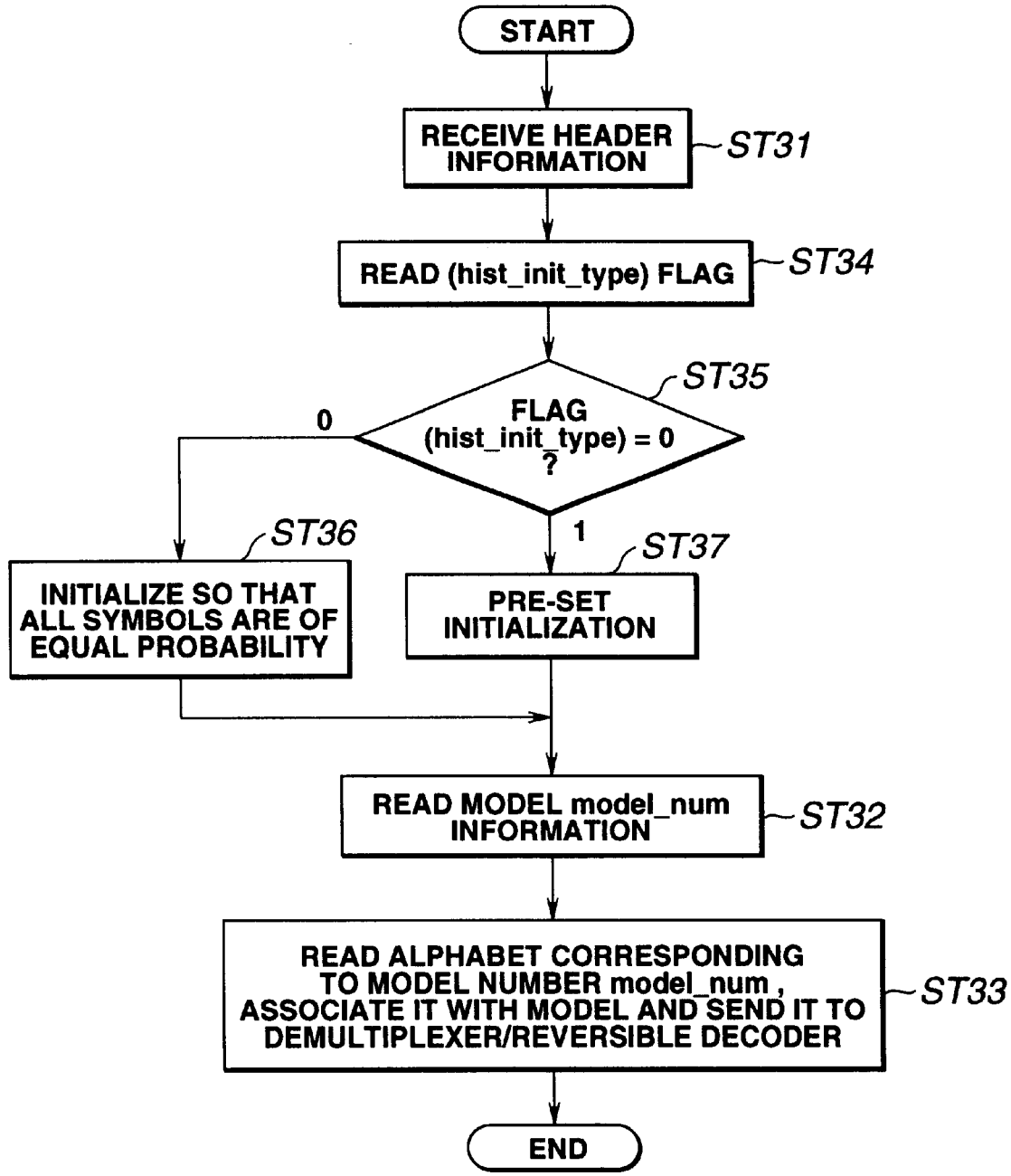
FIG. 18 is a flowchart for illustrating the operation of a controller of a decoding apparatus according to the seventh embodiment of the present invention.

The sequence of operations for determining the method for arithmetic decoding of the inverse wavelet coefficients in the decoding device 300 of the present embodiment, based on the above-described bitstream header, is explained with reference to a flowchart of FIG. 18. The controller 353 of the decoding device 300 of FIG. 2 performs this sequence of operations.

If, as in FIG. 5, the header information separated by the demultiplexer/reversible decoder 302 from the bitstream is sent at step ST31 to the controller 353 of the decoding device 300, the controller 353 reads the flag (hist-init_type) from the header information to initialize each model at steps ST35 to ST37 in accordance with the method associated with this flag. That is, the controller judges at step ST35 whether the flag (hist-init_type) is 0 or 1. If the flag (hist-init_type) is 0, the controller proceeds to step ST36 to initialize each model so that all symbols will be of equal probability. If the flag (hist-init_type) is 1, the controller proceeds to step ST37 to perform another pre-set initialization. For example, the controller allocates occurrence probability values different from symbol to symbol, as shown by the equation (25). The ensuing operation is similar to that of the flowchart for the sixth embodiment shown in FIG. 16 and hence is not explained specifically.

Meanwhile, the flag (hist-init_type) may be represented by 2 or more bits in order to enable selection of two or more initialization methods.

In the present seventh embodiment, it is assumed that a sole value of the flag (hist-init_type) corresponds to a specified initialization method and that the initialization method applies to all models. It is however possible to set initialization methods different from model to model for a given value of the flag (hist-init_type).

As the header information of the eighth embodiment of the present invention, the header information shown in FIG. 19 may be used. The portions in the present eight embodiment pertinent to the alphabetical size shown in the sixth or seventh embodiment may be the same as those of these embodiments and hence are not explained specifically.

It is also assumed that, in the present eighth embodiment, in which each histogram monitors the occurrence frequency of plural symbols (corresponding to i of the equations (24) or (25)), a priority ranking is accorded to each symbol value. If, for example, the symbol is the value of the quantized wavelet coefficient, the priority ranking can be made higher the smaller the corresponding absolute values.

The flag (hist-init_type) in FIG. 19 is the same as that of the seventh embodiment. The flag (hist-download) is a 1-bit flag specifying whether or not the initial state of the histogram is to be downloaded. If this value is 0, all histograms are initialized in accordance with the method specified by the flag (hist-init_type). If the value of the flag (hist-download) is 1, the histogram is initialized using the initial state arrayed as the trailing side information. The initial state of the histogram means the initial value of the degree for each symbol value.

The items downstream of hist_num in FIG. 19 are present only if the flag (hist-download) is 1. The information of hist_num in FIG. 19 denotes the number of histograms of downloading of the initial state.

The information hist_idx_0, hist_idx_1, . . . , shown in FIG. 19, is an index showing to which models the trailing side initial state belongs to. If, for example, priority ranking is accorded to plural models as shown in the sixth embodiment, this ranking may be used.

The information represented by entry_num_m in FIG. 19 denotes the number of initial values downloaded for the histogram of the model m.

The information represented by v0, v1, . . . in FIG. 19 represents the initial value of the histogram associated with each model. These are set in the histogram as initial values of the degree of symbolic values of the number of items represented by entry_num_m in FIG. 19. In the same histogram, the pre-set value for the symbolic value not downloaded is used as an initial value, as shown by the equation (26):

$$Hm(p(j)) = \begin{cases} v_j & j < \text{etry\_num\_m} \\ A & j \geq \text{etry\_num\_m} \end{cases} \quad (26)$$

In the above equation, j denotes the number of the order of priority and p(j) denotes the function which returns the symbolic value of the priority order j. In the equation, A is a pre-set constant. The histogram the initial value of which is not downloaded for the symbolic value of the drift is initialized by the method specified by the flag (hist-init_type).

Figure 20:
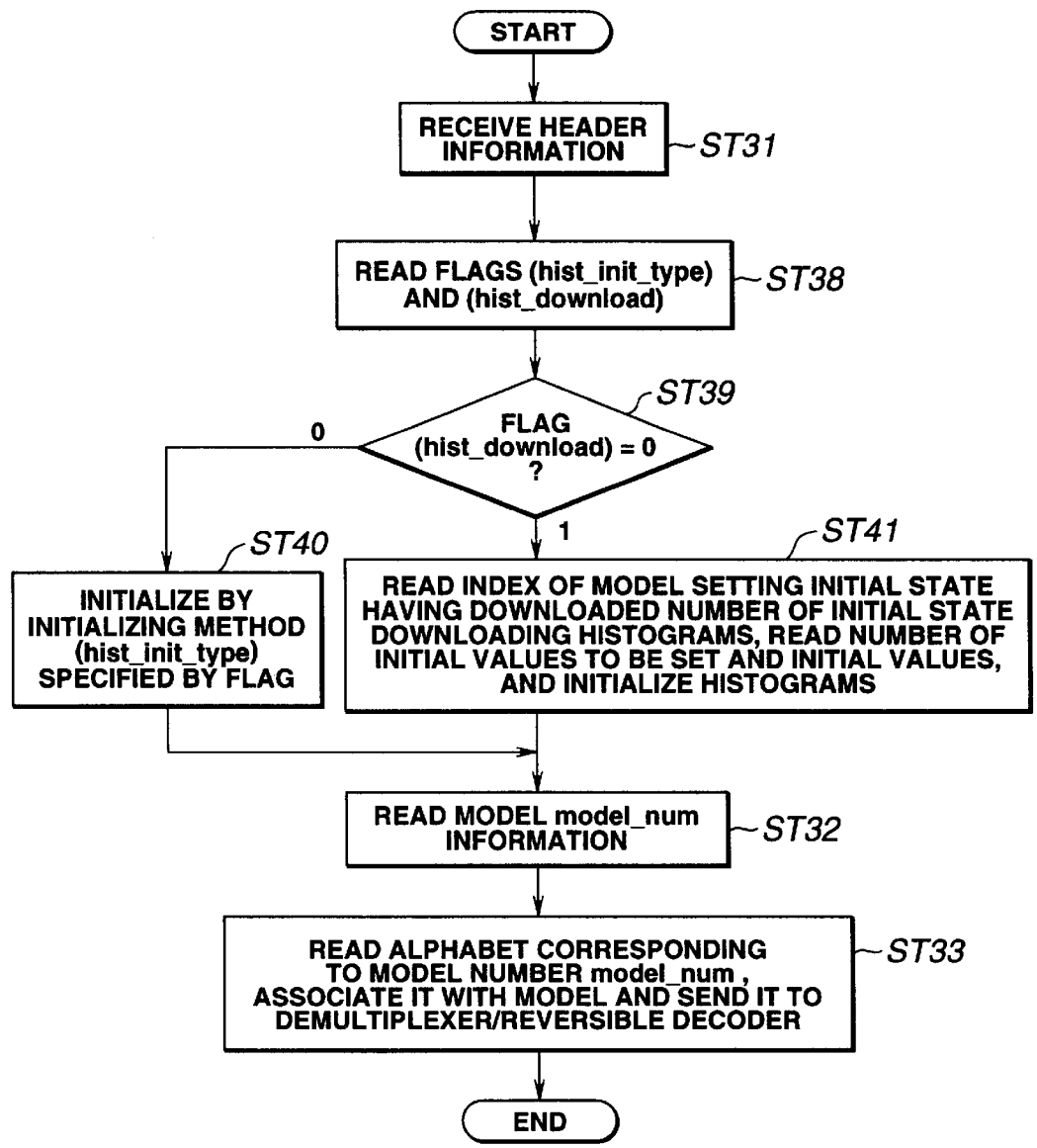
FIG. 20 is a flowchart for illustrating the operation of a controller of a decoding apparatus according to the eighth embodiment of the present invention.

The sequence of operations for determining the method for arithmetic decoding of the inverse wavelet coefficients in the decoding device 300 of the present embodiment based on the bitstream header as described above is explained by referring to the flowchart of FIG. 20. The processing of this sequence of operations is taken charge of by the decoding device 300 of FIG. 2.

First, if the header information separated at step ST31 by the demultiplexer/reversible decoder 302 is sent to the controller 353 of the decoding device 300, the controller 353 reads at step ST38 the flag (hist-init_type) of the head information and the flag (hist_download) used for judging whether or not the initial state of the histogram is arranged in the succeeding information. The controller 353 then proceeds to step ST39 in order to set the initializing method based on these two flags. The controller 353 then proceeds to step ST40 in order to effect initialization by the initializing method specified by the flag (hist-init_type). The specified manner of initialization is the same as the steps ST35 to ST37 of the flowchart of FIG. 18 of the seventh embodiment and hence is not explained specifically. If the value of the flag (hist-init_type) is 1, the controller proceeds to step ST41 to read the number of histograms for downloading the initial state, the index of the model setting the downloaded initial state, and the initial value, in order to use these to initialize the histograms as described above. The ensuing operation is the same as that of the flowchart of FIGS. 16 and 18 of the sixth and seventh embodiments and hence is not explained specifically.

The header information pertinent to the arithmetic encoding in the fifth to eighth embodiments of the header information pertinent to the filer coefficients for synthesis has been explained in the first to fourth embodiments. These two items of the header information may also be combined to the header information.

According to the present invention, as described above, the filters can be switched depending on the picture or on the computational capability furnished by the device, by encoding data using wavelet transform and appending the encoding information used for decoding by the decoding device side to transmit the resulting data to the decoding side. On the other hand, optimum initial setting can be achieved depending on the input picture or bitrate to realize an optimum picture quality.

The present invention can be optionally modified or applied without departing from the purport of the invention without being limited to the specified illustrative embodiments.

What is claimed is:

1. A data encoding method, comprising the steps of:

encoding data using wavelet transform; and appending information on the encoding, used for decoding, to a bitstream of data encoded using the wavelet transform for transmitting resulting data;

wherein the appending step appends to said bitstream, as information on the encoding, a flag specifying whether a filter previously set for decoding or any other optional filter is to be used; and wherein if said flag specifies that said other optional filter is to be used, the appending step arrays, as information on the encoding, a number of taps of the filter, a phase shift quantity, and filter coefficients on a trailing side of the flag.

2. The data encoding method as recited in claim 1, wherein if said flag specifies that said other optional filter is to be used, the appending step arrays, as information on the encoding, parameters defining a method for extrapolation applied to a terminal portion of a data string on the trailing side of the flag.

3. A data encoding apparatus, comprising:

an encoding unit for encoding data using wavelet transform; and a bitstream generating unit for appending information on the encoding, used for decoding by a decoder, to a bitstream of data encoded using the wavelet transform to transmit resulting data;

wherein said bitstream generating unit appends, as information on the encoding, a flag indicating whether a pre-set filter at the decoder or another optional filter is used, and wherein said bitstream generating unit, when generating said flag denoting use of the other optional filter, arrays a number of taps, a phase shift amount, and filter coefficients of filters used at the decoder, as information on the encoding, on a trailing side of said flag.

4. The encoding apparatus as recited in claim 3, wherein said bitstream generating unit, when generating said flag denoting use of the other optional filter, arrays parameters defining a method for extrapolation applied to a terminal portion of a data string as information on the encoding.

5. A data decoding method for decoding an input bitstream wherein the input bitstream is made up of data encoded using wavelet transform and information on the encoding, comprising the steps of:

separating the encoded data and information on the encoding from each other; and decoding the encoded data based on said information on the encoding;

wherein the information on the encoding includes a flag for determining whether a pre-set filter or an optional filter is to be used for decoding; and wherein if said flag specifies use of the optional filter, said decoding step performs inverse wavelet transform using said optional filter based on a number of taps, a phase shift amount and information on a filter coefficient, which is arrayed on a trailing side of said flag.

6. The data decoding method as recited in claim 5, wherein if said flag indicates said optional filter, the decoding step, which is based on parameters defining a method for extrapolation, uses said optional filter in order to execute inverse wavelet transform.

7. A data decoding apparatus for decoding an input bitstream wherein said input bitstream is made up of data encoded using wavelet transform and information on the encoding, comprising:

a separating unit for separating the encoded data from information on the encoding; and a decoding unit for decoding the encoded data based on information on the encoding;

wherein said information on the encoding includes a flag for determining whether a pre-set filter or an optional filter is used for decoding;

wherein if said flag indicates using said optional filter, said separating unit separates a number of taps, a phase shift amount, and filter coefficient information arrayed on a trailing side of said flag; and wherein said decoding unit performs inverse wavelet transform using the optional filter based on the number of taps, the phase shift amount and the filter coefficient information.

8. The data decoding apparatus according to claim 7, wherein if said flag indicates using said optional filter, said separating unit separates parameters defining an extrapolation method arrayed on a trailing side of said flag; and wherein said decoding unit performs inverse wavelet transform using the other optional filter based on the parameters defining the extrapolating method.

* * * * *